US011068883B2

(12) United States Patent
Haggerty et al.

(10) Patent No.: US 11,068,883 B2
(45) Date of Patent: *Jul. 20, 2021

(54) APPARATUS AND METHODS FOR SECURE ELEMENT TRANSACTIONS AND MANAGEMENT OF ASSETS

(71) Applicant: Apple Inc., Cupertino, CA (US)

(72) Inventors: David T. Haggerty, San Francisco, CA (US); Ahmer A. Khan, Milpitas, CA (US); Christopher B. Sharp, Cupertino, CA (US); Jerrold Von Hauck, Windermere, FL (US); Joakim Linde, Palo Alto, CA (US); Kevin P. McLaughlin, Mountain View, CA (US); Mehdi Ziat, San Francisco, CA (US); Yousuf H. Vaid, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 15/482,478

(22) Filed: Apr. 7, 2017

(65) Prior Publication Data

US 2017/0278097 A1    Sep. 28, 2017

Related U.S. Application Data

(63) Continuation of application No. 14/174,791, filed on Feb. 6, 2014, now Pat. No. 9,619,799.

(Continued)

(51) Int. Cl.
*G06Q 20/36* (2012.01)
*G06Q 20/38* (2012.01)
(Continued)

(52) U.S. Cl.
CPC ......... *G06Q 20/36* (2013.01); *G06Q 20/1235* (2013.01); *G06Q 20/3227* (2013.01); *G06Q 20/3552* (2013.01); *G06Q 20/382* (2013.01)

(58) Field of Classification Search
None
See application file for complete search history.

(56) References Cited

U.S. PATENT DOCUMENTS 7,499,967 B2    3/2009  Hulse et al.
7,734,732 B2    6/2010  Soelberg et al.
(Continued)

FOREIGN PATENT DOCUMENTS

CA    2371734 A1    11/2000
CN    1183841 A     6/1998
(Continued)

OTHER PUBLICATIONS

T. Dierks et al.: "The TLS Protocol Version 1.0", https://www.ietf.org/rfc/rfc2246.txt, Jan. 1999.
(Continued)

*Primary Examiner* — Jacob C. Coppola
*Assistant Examiner* — Jason B Fenstermacher
(74) *Attorney, Agent, or Firm* — Dickinson Wright RLLP

(57) ABSTRACT

Methods and apparatus for the deployment of financial instruments and other assets are disclosed. In one embodiment, a security software protocol is disclosed that guarantees that the asset is always securely encrypted, that one and only one copy of an asset exists, and the asset is delivered to an authenticated and/or authorized customer. Additionally, exemplary embodiments of provisioning systems are disclosed that are capable of, among other things, handling large bursts of traffic (such as can occur on a so-called "launch day" of a device).

19 Claims, 18 Drawing Sheets

Related U.S. Application Data

(60) Provisional application No. 61/761,654, filed on Feb. 6, 2013.

(51) Int. Cl.
*G06Q 20/32* (2012.01)
*G06Q 20/12* (2012.01)
*G06Q 20/34* (2012.01)

(56) References Cited

U.S. PATENT DOCUMENTS

| | | | |
|---|---|---|---|
| 8,196,131 | B1 | 6/2012 | von Behren et al. |
| 8,200,736 | B2 | 6/2012 | Shi et al. |
| 8,566,168 | B1 | 10/2013 | Bierbaum et al. |
| 8,996,002 | B2 | 3/2015 | Rodgers et al. |
| 9,619,799 | B2 | 4/2017 | Haggerty et al. |
| 2003/0024975 | A1 | 2/2003 | Rajasekharan |
| 2003/0191945 | A1* | 10/2003 | Keech ............ G06Q 20/341 713/182 |
| 2004/0230328 | A1 | 11/2004 | Armstrong et al. |
| 2006/0085351 | A1 | 4/2006 | Hug |
| 2006/0195546 | A1 | 8/2006 | Hulse et al. |
| 2007/0178885 | A1* | 8/2007 | Lev ............ H04L 63/083 455/411 |
| 2008/0082449 | A1 | 4/2008 | Wilkinson et al. |
| 2009/0037285 | A1 | 2/2009 | Murphy |
| 2009/0164322 | A1 | 6/2009 | Khan et al. |
| 2010/0088188 | A1 | 4/2010 | Kumar et al. |
| 2012/0130838 | A1* | 5/2012 | Koh ............ G06Q 20/3552 705/26.1 |
| 2012/0144201 | A1* | 6/2012 | Anantha ......... H04W 12/0609 713/172 |
| 2012/0150742 | A1 | 6/2012 | Poon et al. |
| 2012/0158580 | A1 | 6/2012 | Eram et al. |
| 2012/0254030 | A1 | 10/2012 | Khan et al. |
| 2013/0024383 | A1* | 1/2013 | Kannappan ......... H04W 12/06 705/71 |
| 2013/0227646 | A1 | 8/2013 | Haggerty et al. |
| 2014/0286492 | A1* | 9/2014 | Vasudevan ......... G07C 9/00571 380/270 |
| 2019/0394054 | A1 | 12/2019 | Pirzadeh et al. |

FOREIGN PATENT DOCUMENTS

| | | | | |
|---|---|---|---|---|
| CN | 101295394 | A | 10/2008 | |
| CN | 101523428 | A | 9/2009 | |
| CN | 102656599 | A | 9/2012 | |
| CN | 102845040 | A | 12/2012 | |
| EP | 2741461 | A1 | 6/2014 | |
| EP | 2741461 | A1 * | 6/2014 | ........... G06F 21/335 |
| JP | 2003070067 | A | 3/2003 | |
| JP | 2010045542 | A | 2/2010 | |
| JP | 2011509575 | A | 3/2011 | |
| JP | 2012505475 | A | 3/2012 | |
| JP | 2013535142 | A | 9/2013 | |
| KR | 1020120041038 | A | 4/2012 | |
| KR | 1020120076654 | A | 7/2012 | |
| KR | 1020120108599 | A | 10/2012 | |
| TW | I308281 | B | 4/2009 | |
| WO | 2011159549 | A1 | 12/2011 | |
| WO | 2012053780 | A1 | 4/2012 | |
| WO | 2012168940 | A1 | 12/2012 | |

OTHER PUBLICATIONS

PCT Application No. PCT/US2014/015050—International Search Report & Written Opinion dated May 26, 2014.
Japanese Patent Application No. 2015-557060—Office Action dated Oct. 7, 2016.
Taiwanese Patent Application No. 103103966—Office Action dated May 28, 2015.
Japanese Patent Application No. 2017-035054—First Office Action dated Mar. 2, 2018.
Chinese Patent Application No. 201480007462.4—Second Office Action dated Mar. 9, 2018.
Chinese Application for Invention No. 201480007462.4—Office Action dated Jul. 14, 2017.
Chinese Patent Application No. 201811127019.7—First Office Action dated Apr. 12, 2021.

* cited by examiner

APPARATUS AND METHODS FOR SECURE ELEMENT TRANSACTIONS AND MANAGEMENT OF ASSETS

CROSS-REFERENCE TO RELATED APPLICATIONS

This application is a continuation of U.S. application Ser. No. 14/174,791, filed Feb. 6, 2014, entitled "APPARATUS AND METHODS FOR SECURE ELEMENT TRANSACTIONS AND MANAGEMENT OF ASSETS", now U.S. Pat. No. 9,619,799, issued Apr. 11, 2017, which claims the benefit of U.S. Provisional Patent Application No. 61/761,654, filed Feb. 6, 2013, entitled "APPARATUS AND METHODS FOR SECURE ELEMENT TRANSACTIONS AND MANAGEMENT OF VIRTUALIZED MEDIUMS OF EXCHANGE", both of which are hereby incorporated by reference herein.

FIELD

The present disclosure relates generally to the field of secure device transactions, and more particularly in one exemplary embodiment to the deployment of financial instruments and other assets.

BACKGROUND

Customers and merchants generally desire convenient and secure means for performing financial and other related transactions. Assets such as credit cards, debit cards, prepaid cards, gift cards, coupons, etc. are all examples of the increasingly "virtualized" nature of currency. Specifically, rather than actually exchanging physical currency or physical coupons for goods and/or services, the transaction is performed with, e.g., an account number or "proxy" account number (e.g., one created for purposes of processing the transaction at the point-of-sale, yet which is not an actual credit or debit account number), and the funds are credited/debited electronically.

Unfortunately, for reasons described in more detail herein, existing solutions for distributing these assets are inefficient and prone to failure. For example, a virtual wallet paradigm can be based on pre-existing accounts; and in order to perform a monetary transaction, a user of a client device must have a pre-existing account with a wallet service, (e.g., a trusted entity that provides an accounting database associated with the wallet), or have already pre-paid the wallet service. Additionally, existing assets are not "fungible", and are dedicated for a specific use when they are created.

As customers and merchants have steadily evolved in transactional complexity and/or convenience (including the increasingly pervasive use of mobile devices), new and improved schemes for distributing assets are needed. Ideally, such solutions should offer reasonable and convenient management capabilities for customers, merchants and issuing entities, without compromising the flexibility of assets.

SUMMARY

The present disclosure addresses the foregoing needs by providing, inter alia, apparatus and methods for secure element transactions and management of assets.

In one embodiment, a method for distributing an asset to a client device is disclosed. The method can be carried out by receiving a request to provision the asset to an account from the client device. The request to provision the asset can be accompanied by a device identifier that uniquely identifies the client device. Next, the request to provision the asset is authenticated. In one case, the request to provision the asset is authenticated using the device identifier in verifying whether the client device is associated with the account. Upon authenticating the request, the asset is provisioned to the account and the asset is assigned to the client device. Next, an asset identifier uniquely identifying the assigned asset is received from a remote device such as an asset locker. The asset identifier is then sent to the client device. Subsequently, the client device can request the assigned asset using the asset identifier. Upon receiving a request for the assigned asset and the asset identifier from the client device, the assigned asset is delivered to the client device.

In another embodiment, a method for distributing an asset to a client device is disclosed. The client device is associated with a device identifier that uniquely identifies the client device. The method is carried out by pre-configuring the asset for the client device. The pre-configuring process can include (i) encrypting the asset with a unique key based on the device identifier, (ii) embedding challenge data in the asset, and/or (iii) associating the asset with a user account. Accordingly, the asset is configured or "personalized," for the client device. Next, the pre-configured asset is associated with an asset identifier. In one aspect of the embodiment, the asset identifier is provided to the client device prior to pre-configuring the asset. The client device can then request the pre-configured asset. The request can include the asset identifier. Upon receiving the request, the pre-configured asset can be delivered to the client device.

In yet another embodiment, a computer readable storage medium is disclosed. The computer readable storage medium store instructions that, when executed by a processor of a client device, cause the client device to send a request to provision an asset to an account. The request can be sent to a remote device. The account can be associated with a user of the client device. Along with the request, the client device can send a device identifier that uniquely identifies the client device. In one aspect of the embodiment, the device identifier is stored on a secure element disposed in the client device. Furthermore, one or more challenges can also be stored on the secure element. The instructions further cause the client device to transmit a challenge to the remote device. The client device can then receive the asset from the remote device. The received asset can include challenge data that the secure element can use to verify if the received asset is valid. The challenge data can be based on the transmitted challenge.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings.

DETAILED DESCRIPTION

Figure 1:
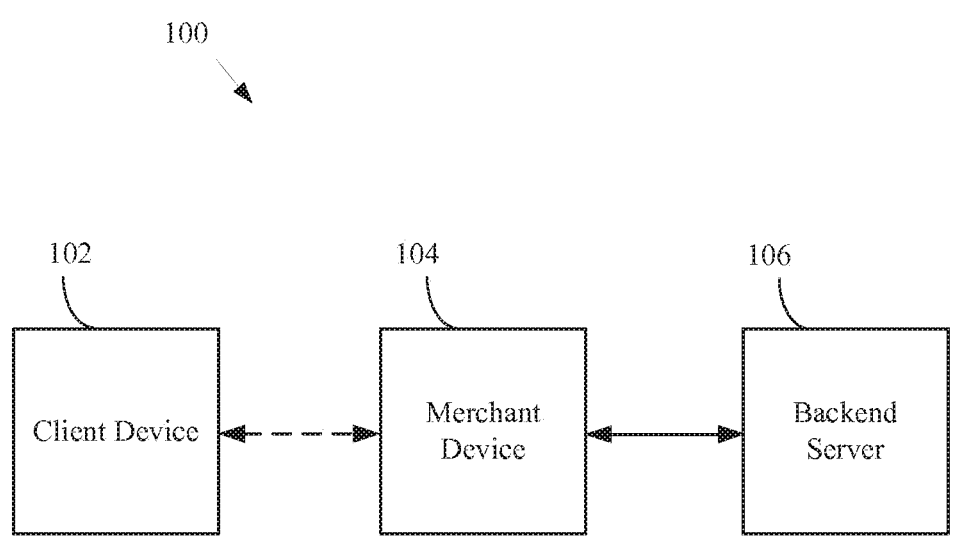
FIG. 1 is a graphical representation of one exemplary configuration of a transactional network, in accordance with the present disclosure.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Virtualized "wallets" can provide significant benefits for customers, merchants and financial institutions. The virtual "contents" of the virtualized wallets can include one or more assets. Any entity (e.g., user, merchant, financial institution, etc.) can transfer these assets freely between appropriately enabled and secure devices; moreover, these assets can be flexibly stored, backed up, etc. Existing solutions provide certain rudimentary transactions, e.g., distribution, updating, patching, etc. via Internet protocol (IP) networks. However, due to the sensitive nature of financial transactions and information, significant security measures are needed to prevent theft, misuse, malicious behavior, etc.

It should be noted that for the context of this discussion, embodiments throughout this disclosure describe assets taking the form of virtualized mediums of exchange (VMEs). Common examples of virtualized mediums of exchange include, without limitation: credit "card" numbers, debit "card" numbers, pre-paid "card" numbers, account information, and virtualized currencies, etc. More generally, virtualized mediums of exchange also encompass instruments with no actual value, e.g., electronic coupons, electronic vouchers, electronic tickets, electronic passes, etc. It should be understood that this description is not limiting and that the described embodiments can be used to distribute anything useful and/or valuable. Furthermore, VMEs can be implemented within a wide variety of data structures that vary in complexity (e.g., strings, arrays, objects, cryptographic elements, etc.); for example, simple implementations can be a simple account number, more complex implementations can incorporate account information, and/ or check values. In some cases, a VME can provide additional features such as, e.g., cryptographic protection, accountability (i.e., transactional history), anonymity, fraud detection, etc.

The described embodiments relate to methods and apparatus for secure transactions and management of VMEs. In one embodiment, a provisioning system distributes a VME to a client device. The provisioning system includes one or more entities that manage and distribute the VME to the client device in accordance with a security protocol having three levels, which can be referred to as L1, L2, and L3. At L1, VMEs are securely generated, stored and encrypted. L1 can be facilitated by one or more asset lockers. L2 controls and manages the number of valid copies of a VME. L2 can prevent inadvertent and/or malicious cloning of a VME. In one aspect of the embodiment, L2 can use one or more challenges to invalidate duplicate copies of a VME once a first copy of the VME is distributed. L2 can be facilitated by one or more asset agents. L3 authenticates and authorizes the distribution of assets to intended client devices. In one aspect of the embodiment, L3 can use an identifier obtained from a secure element disposed in a client device during the authentication process. L3 can also use information associated with a user's account during the authentication process. L3 can be facilitated by one or more asset brokers.

In one embodiment, a provisioning transaction between a client device and a provisioning system is disclosed. The provisioning system includes an asset broker, an asset agent and an asset locker. The client device includes a device identifier associated with the client device. The identifier can be stored and encrypted in a secure element disposed in the client device. A user account can be created when the client device is purchased by the user (i.e., a customer). Alternatively the user account can be a pre-existing account that is identified by the user when the client device is purchased.

The client device requests a VME from an asset broker and provides identifying information, e.g., the device identifier. The asset broker authenticates the identifying information and determines that the SE/client device is associated with the user account. Upon authentication, the asset broker can forward the SE's signature to an asset agent. The asset agent verifies the secure element's identity and identifies a VME for the secure element. Next, the secure element provides a challenge to the provisioning system. Challenge data based on the provided challenge can be embedded in the VME by the asset agent. Accordingly, the challenge data can be used to prevent duplicate copies of the VME from being issued. The asset locker can then provide an identifier associated with the VME, e.g., a VME identifier, for the client device's secure element. Upon receiving the VME identifier, the client device can subsequently request delivery of the VME from the asset broker using the VME identifier.

In another embodiment, the configuration and delivery of the VME can be postponed until a user purchases a client device having a secure element. In this way the client device is not manufactured or pre-programmed with a VME. Rather, the client device is "pre-personalized" such that it is pre-assigned a VME prior to delivering the client device to the user. The "pre-personalization" process can include associating a VME stored in a provisioning system with an identifier associated with the client device. At the time of purchase, authentication information is provided by the user. While in transit (e.g., a time between when the user purchases the client device and when the user requests the VME, and/or a time it takes to ship the client device to the user) the VME can be pre-configured for the client device. Pre-configuring the VME can include (i) encrypting the VME with a key specific to the secure element, (ii) embedding challenge data in the VME, and (iii) associating the VME with the authentication information. The VME is then associated with a VME identifier. Next, the client device can request the VME using the VME identifier. In turn, the provisioning system can deliver the VME to the client device pre-configured. In this way, the VME can be seamlessly loaded onto the client device when the VME is requested without requiring real-time traffic.

In yet another embodiment, a VME from a pool of VMEs is allocated for a client device (e.g., each VME in the pool of VMEs is initially is not associated with a specific client device) prior to receiving a request from the client device for a VME. When the client device is purchased, authentication information is provided by the user. The client device can be provided to the user. In addition to the client device, identifying information that can be used to authenticate the client device, e.g., a device identifier that uniquely identifies the client device is also provided to the user. For example, the device identifier can be gleaned from a sticker disposed on a box the client device is packaged in. The client device can then, at the instruction of the user, provide the device identifier to the provisioning system when requesting activation of a VME.

These and other embodiments are discussed below with reference to FIGS. 1 to 13C; however, those skilled in the art will readily appreciate that the detailed description given herein with respect to these figures is for explanatory purposes only and should not be construed as limiting.

Referring now to FIG. 1, one exemplary transactional network 100 is illustrated. The exemplary transactional network 100 includes one or more client devices 102, one or more merchant devices (also referred to as a "point of sale" (POS)) 104, and one or more backend servers 106. Those having ordinary skill in the related arts will readily appreciate that the foregoing transactional network 100 is merely illustrative of the broader array of possible network topologies and functions. Moreover, it should be recognized that various implementations may combine and/or further divide the various entities illustrated in FIG. 1.

A transaction is performed when the client device 102 cryptographically encrypts and sends transaction information to the merchant device 104. In one example, the client device 102 can include a virtual "wallet" configured to execute transactions with the merchant device 104 by, e.g., swiping against an appropriate reader (such as near-field communication (NFC), etc.), visual inspection of a transaction identifier (e.g., a bar code, a number, etc.) from a graphical user interface (GUI), etc. In another example, the client device 102 can include a global positioning system (GPS) receiver or other location information (e.g., Wi-Fi presence, etc.) that is used to alert the merchant device 104 (e.g., register, mobile tablet, etc.) to the presence of the client device 102, and subsequent validation of the user of client device 102 (e.g., biometrics such as a photo of their face) is conducted in order to authorize the charging of a known user account. The transaction information can include a combination of: (i) an alias, (ii) an incrementing counter, (iii) a random number, (iv) a merchant identifier, (v) other transaction errata (e.g., amount transacted, time stamps, location stamps, etc.).

The merchant device 104 provides the protected transaction information to the backend server 106. Thereafter, the backend server 106 can decrypt the protected transaction information, verify the transaction, and process the transaction appropriately. For example, an alias value is mapped to a credit card number, and if the encrypted information is correct, then the backend server 106 processes the transaction with the credit card number that is mapped to the alias value. Otherwise, if the transaction information is corrupted, or appears fraudulent, the transaction is denied.

Within the exemplary transactional network 100, the cryptographic protection applied to the transaction information protects the user's valuable information from any malicious parties and/or the merchant. Specifically, even if a malicious party were to attempt to intercept the transaction information or if the merchant device 104 was compromised (with, e.g., a virus, etc.), the cryptographic protection can assist in preventing the transaction from being re-played later in a fraudulent manner. Accordingly, to maximize user protection, the cryptographic elements are physically protected within a secure element disposed in the client device 102, which may include a secure processor, a secure file system, and operational memory. However, those of ordinary skill in the related arts will recognize that preserving the security of the cryptographic material stored within the client's device is difficult. For example, one such problem is initial configuration, deployment, and maintenance. Client devices are manufactured by device manufacturers (which may be untrusted). Also, certain business models may be dependent on a market of third party participants (which may be untrusted).

Ideally, solutions for distributing cryptographic material should be scalable over large distribution networks. Moreover, a distribution scheme must protect the cryptographic materials (credentials) from any intermediary entities (e.g., device manufacturers, third party brokers, etc.). In some embodiments, cryptographic materials should be unique (i.e., a single asset instance is usable in only a single secure element at a time). Finally, solutions should minimize requirements for real-time interaction.

Figure 2:
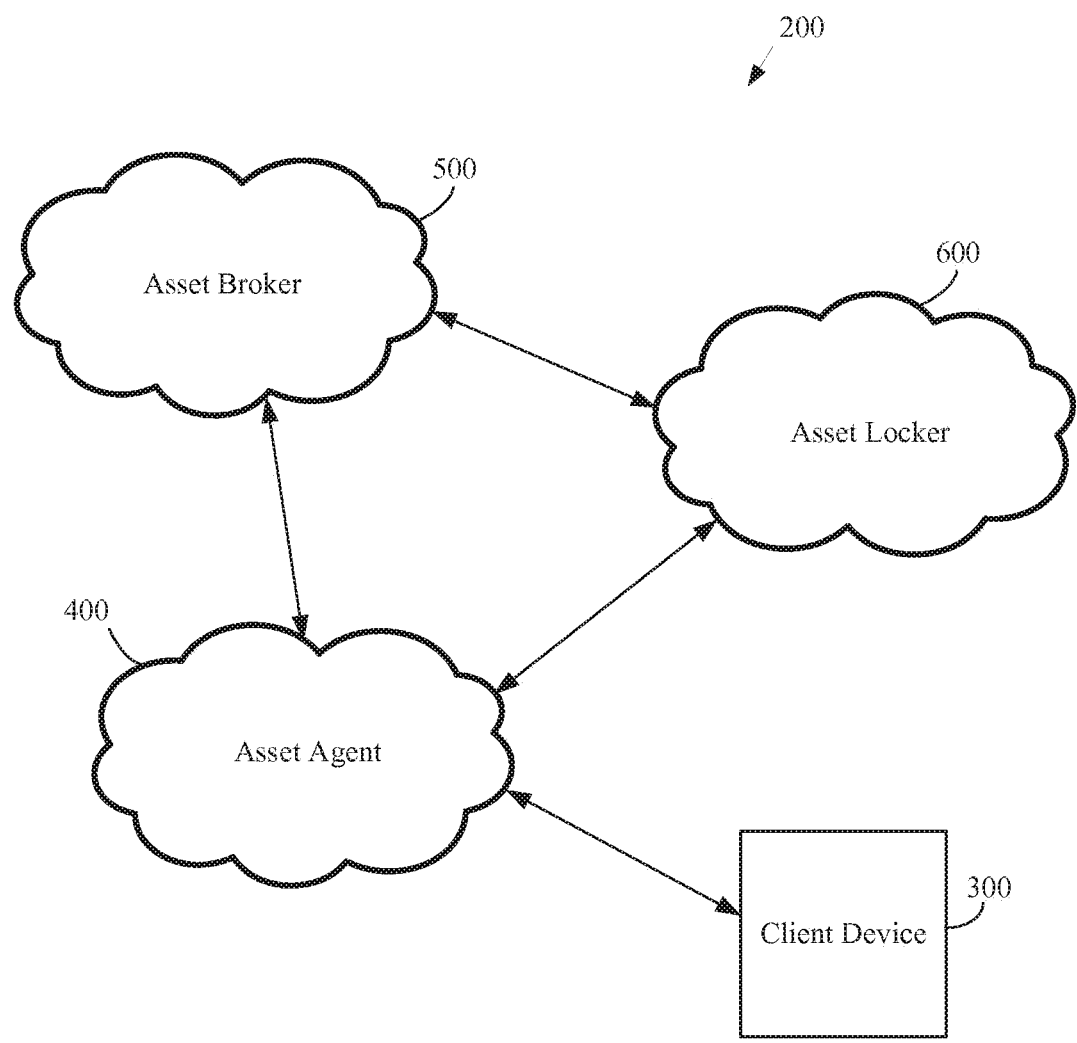
FIG. 2 is a graphical representation of one exemplary configuration of a provisioning system, in accordance with the present disclosure.

Referring now to FIG. 2, one exemplary provisioning system 200 is illustrated. As shown, the provisioning system 200 includes: client device 300, asset agent 400, asset broker 500, and asset locker 600. As previously described, within the context of VME operation, VME security can further be subdivided into levels including: Level 1 (L1), Level 2 (L2), and Level 3 (L3). Each level can be facilitated by an element of the provisioning system 200.

Asset locker 600 can be used to carry out VME security in accordance with Level 1 (L1) security. As used herein, Level 1 security refers generally and without limitation to security mechanisms configured to protect the secrets and/or cryptographic materials contained within a VME (e.g., secure keys, cryptographic material, user history, etc.). Furthermore, the term "security" generally refers to protection of data and/or software. For example, cryptographic security protects data and/or software associated with a VME from theft, misuse, corruption, publication and/or tampering, by unauthorized activities, and/or malicious third parties.

Asset agent 400 can be used to carry out VME security in accordance with Level 2 (L2) security. As used herein, Level 2 security refers generally and without limitation to security mechanisms for preventing accidental and/or malicious cloning of a VME (conservation enforcement). Furthermore, the terms "conservation", "conserve" and "conserved", as used herein refer to an element (either physical or virtual), that cannot be trivially multiplied or diminished. For example, a conserved VME cannot be copied or replicated during normal operation. Additionally, as used herein, the terms "uniqueness" as applied to an element (either physical or virtual), refers to the property whereby the element is the one and only element having a particular property and/or characteristic. For instance, a unique VME cannot have a duplicate VME.

Asset broker 500 can be used to carry out VME security in accordance with Level 3 (L3) security. As used herein, Level 3 security refers generally and without limitation to security mechanisms that securely deliver VMEs to a device (e.g., client device, POS, etc.) associated with an intended user (e.g., an individual, an enterprise, a machine client, etc.). Moreover, as used herein, the term "user authorization" generally refers to specifying a user's access to resources. With popular mediums of exchange (credit cards, debit cards, cash), transactions can require physical possession of the medium; and the physical card is protected by the user. For example, when a physical credit card is used, it is assumed that the card is in the possession of the user (and implicitly authorized by the user). Within the context of VME operation, analogous capabilities are needed for user authorization of VME transfers. In particular, the "owner" of the VME (and also the provisioning system 200) needs assurances that the VME is only transferred to one or more legitimate devices.

For reasons, which will be made clear hereinafter, each level of security is associated with a limited set of capabilities/responsibilities; thus, a device that provides Level 2 security can freely perform actions associated with Level 2, but must also be Level 1 security capable to affect Level 1 elements of the VME. For example, an asset agent (described in greater detail hereinafter) prevents a VME from being cloned; however, the asset agent does not necessarily have the ability to change cryptographic material contained within the VME, nor is the asset agent responsible for detecting corrupted cryptographic material.

The foregoing definitions of VME security levels are purely illustrative, and are not intended to limit the descriptions herein. In fact, it is appreciated that the foregoing terminology should be considered "colloquial language" within the relevant arts, and likely to change in view of incipient evolution of the related industries and/or technologies.

It is appreciated that software is often more flexible than hardware; for example, software is easy to copy, modify, and distribute. Additionally, software can often be made cheaper, more power efficient, and physically smaller than hardware equivalents. However, the sensitive nature of VME data (e.g., customer financial information, asset broker cryptographic secrets, etc.) requires special consideration. It is expected that unintended duplication, and/or destruction of VMEs must be avoided in the interest of user protection. Accordingly, VME operation should satisfy the following properties: (i) security, (ii) uniqueness, and (iii) conservation.

In one exemplary embodiment, a distribution infrastructure is disclosed that enables delivery of VMEs to secure elements. A secure element can be disposed in a client device and/or a merchant device. Moreover, various functions of the disclosed infrastructure can be flexibly partitioned and/or adapted such that individual parties (e.g., device manufacturers, third party retailers, customers, etc.) can host portions of the infrastructure; such piecemeal solutions can be optimized for each individual party's needs. Still further, exemplary embodiments can provide operational redundancy.

Figure 3A:
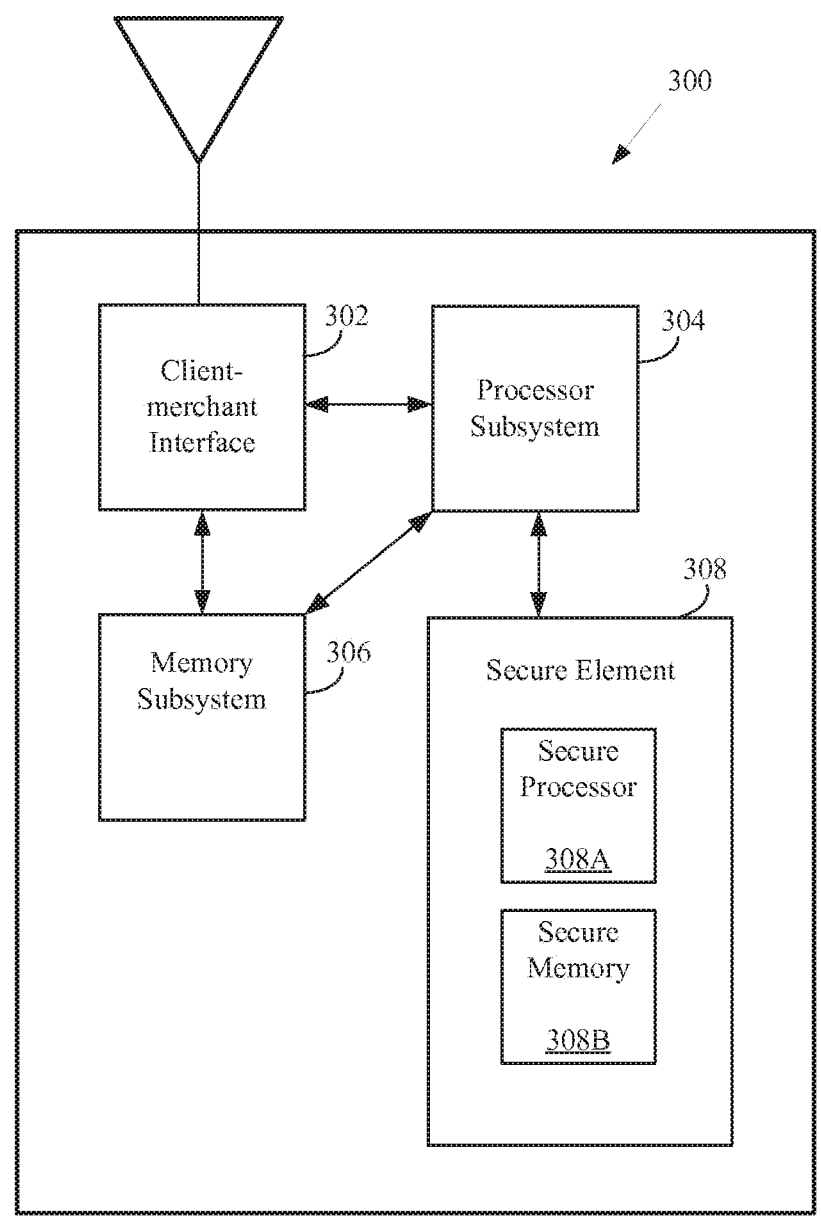
FIG. 3A is a logical block diagram of one exemplary embodiment of a client device, in accordance with the present disclosure.

Referring now to FIG. 3A, one exemplary client device 300 is presented. The exemplary client device 300 includes: a client-merchant interface 302, a processor subsystem 304, a non-transitory computer readable medium (memory subsystem) 306, and a secure element 308. In some variants, the secure element 308 further includes a secure processor 308A and a secure non-transitory computer readable medium (secure memory) 308B. As used herein, the term "client device" includes, but is not limited to devices that are configured to transact and/or manage one or more of a user's VMEs. Common examples of client devices are, inter alia, wireless-enabled cellular telephones, smartphones (such as for example an iPhone™), wireless enabled personal computers (PCs), mobile devices such as handheld computers, personal digital assistants (PDAs), personal media devices (PMDs), wireless tablets (such as for example an iPad™), so-called "phablets", or any combinations of the foregoing.

The processor subsystem 304 can include one or more of a digital signal processor, microprocessor, field-programmable gate array, or plurality of processing components mounted on one or more substrates. The processor subsystem 304 can also include an internal cache memory. The processor subsystem 304 is in communication with the memory subsystem 306, the latter including memory which can, for example, include static random-access memory (SRAM), flash, and/or synchronous dynamic random access memory (SDRAM) components. The memory subsystem 306 can implement one or a more of direct memory access (DMA) type hardware, so as to facilitate data accesses as is well known in the art. The memory subsystem 306 of the exemplary embodiment contains computer-executable instructions which are executable by the processor subsystem 304.

In one exemplary embodiment, the client device 300 comprises one or more interfaces, e.g., the client-merchant interface 302, adapted to connect to a merchant device. The client-merchant interface 302 can be a wireless interface or alternately a physical interface (wired). Wireless interfaces can include "touch" or "bump" type interfaces which have operating ranges up to a few centimeters (e.g., radio-frequency identification (RFID), NFC, etc. such as for example those complying with International Organization for Standardization (ISO) Std. 14443A/B, incorporated herein by reference in its entirety) to more powerful wireless interfaces such as e.g., Global System for Mobile Communications (GSM), Code Division Multiple Access (CDMA), Universal Mobile Telecommunications System (UMTS), Long Term Evolution (LTE)/LTE-Advanced, Worldwide Interoperability for Microwave Access (WiMAX), Wi-Fi, Bluetooth, Wireless Universal Serial Bus (USB), etc. Common examples of physical interfaces include e.g., USB (e.g., USB 2.0, USB 3.0), FireWire, Thunderbolt, etc. Moreover, it is further appreciated that certain devices can have a "card" type form factor, such as for example a subscriber identity module (SIM) card or credit card, etc. These "card" devices can provide backward compatibility with the existing ecosystem of payment readers, while still supporting the improved functionalities described herein.

In some embodiments, the client device 300 can additionally include other components such as, e.g., a user interface subsystem that includes any number of well-known I/O including, without limitation: a keypad, a touch screen (e.g., multi-touch interface), a liquid-crystal display (LCD), a backlight, a speaker, and/or a microphone. It is recognized that in certain applications, a user interface may be unnecessary. For example, card-type client embodiments can lack a user interface.

In the illustrated embodiment, the client device 300 includes a secure element 308. The secure element 308 includes in this embodiment: a secure processor 308A executing software stored in the secure memory 308B. The secure memory 308B is inaccessible to all other components (other than the secure processor 308A). Moreover, the secure element 308 can be further hardened physically to prevent tampering (e.g., encased in resin).

The secure element 308 is capable of receiving, transferring and storing one or more VMEs. In one embodiment, the secure element 308 stores an array or plurality of VMEs associated with a user (e.g., credit "cards", debit "cards", prepaid account or card numbers, bus passes, movie ticket vouchers, coupons, "loyalty" program elements, etc.). In some variants, each VME can further be associated with a small file system including computer readable instructions, and associated data (e.g., cipher keys, integrity keys, etc.).

The file system can support additional features. For example, the file system can include programs and data for e.g., security (for example: authentication programs, authorization programs, and cryptographic materials to protect communications with other entities), user management (e.g., account balance information, recent transaction history, etc.), etc. Those of ordinary skill in the related arts will readily appreciate that a VME with its associated file system is a unique and conserved data asset.

Moreover, in one embodiment, the secure element 308 maintains a listing or manifest of stored VMEs and their associated file systems. The manifest can include information as to the current status of the stored VMEs; such information can include for example: availability for use, validity, account information (e.g., current balance, etc.), and/or prior experienced errors. The manifest can be further linked or coupled to a user interface, so as to enable user selection of an available VME for use. In some cases, the user can select one VME as a default (e.g., a default credit card) for e.g., all transactions, all transactions with a merchant, all transactions within a time range, etc.

In some variants, the secure element 308 can have one or more associated device cryptographic keys. These device keys are used to secure exchanges. In one such variant, the cryptographic keys are an asymmetric public/private key pair for encrypting messaging transactions. The public key can be freely distributed without compromising the integrity of the private keys. For example, the client device 300 may be assigned (or internally generate) a public/private key based on the Rivest, Shamir and Adleman (RSA) algorithm; the public key is made available to any device that wishes to securely communicate with the client device 300. A message encrypted with a public key of the client device 300 can only be decrypted by the client device's own private key (which is securely stored in the client device 300). In other variants, the cryptographic keys are symmetric (i.e., the encrypting device and decrypting device have the same key). Symmetric variants may provide reduced cryptographic complexity but require that both the encrypting device and decrypting device strongly protect the shared key.

In other variants, the secure element 308 can have cryptographic keys for verifying and/or issuing digital certificates. A digital certificate can be used for e.g., verification of the identity of the issuer (of the certificate). For example, the secure element 308 can issue a digital certificate to a merchant device, such that the merchant device can later prove that the transaction has occurred (by retrieving the client device's signed certificate). Similarly, the secure element 308 can verify a digital certificate provided from a merchant device that proves the merchant device can be trusted.

During a client-merchant transaction (or client/third-party intermediary transaction), the secure element 308 performs a transaction with an associated one or more VMEs. Simple embodiments can be a transmission of an account number, "proxy" number, or subset thereof. In more complex variants, the transmission can incorporate, e.g., an amount transacted, cryptographic protection, attestation information (e.g., time/date and location of transaction), merchant ID information, etc.

While many of the embodiments described herein are described in the context of financial transactions, non-financial transactions are equally suitable. For example, vouchers, tickets, etc. can be incremented and/or decremented a number of credits according to use. In other examples, the transaction can be a validity check; for example, a bus pass is valid for a temporal range (e.g., days, weeks, months, years, etc.), thus any number of uses within that temporal range is valid. Similarly, certain types of passes may be subject to, e.g., "blackout" dates where the pass is invalid for the blackout period.

In some embodiments, the client-merchant (or other) transaction is performed between the client device 300 and a merchant device at a common time (i.e., the client device 300 and merchant device both experience the transaction at the same time); for example, in an NFC transaction, a client device NFC interface is disposed proximate ("bumped") to a merchant device NFC interface, such as an interrogator which transmits a signal to an at least partly passive NFC IC on the client device 300.

However, it is appreciated that in alternate scenarios, a client-merchant transaction can be performed in a time-shifted manner. For example, a client device or merchant device may initiate the transaction at a first time, and the corresponding device acknowledges the transaction at a later time. Once the devices have both acknowledged the transaction, then the transaction can be completed (e.g., transferring the appropriate funds, etc.). For example, a client and a merchant perform a transaction at e.g., a farmers market where there is no connectivity. Later when the merchant device connects to an asset broker, the transaction is initiated. Subsequently thereafter, the client device synchronizes its transaction record which completes the transaction. In some cases, the asset broker can further notify the client device when outstanding charges are incurred.

Figure 3B:
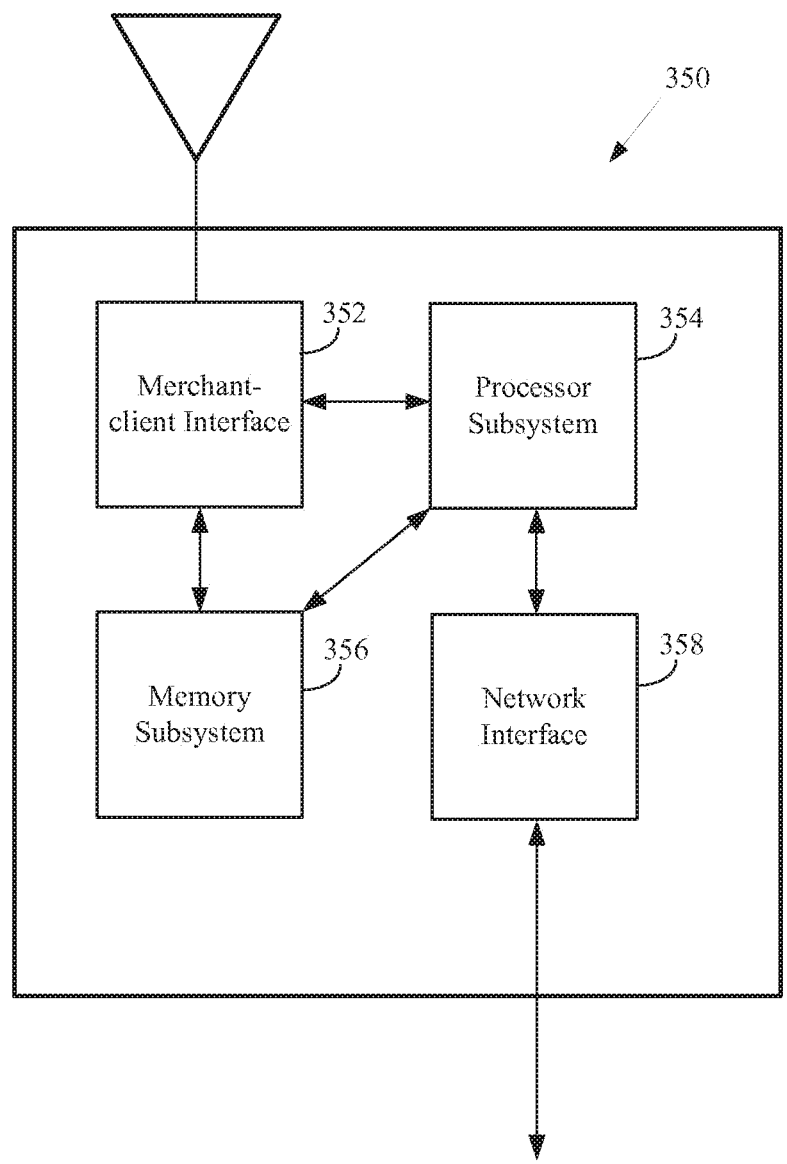
FIG. 3B is a logical block diagram of one exemplary embodiment of a merchant device, in accordance with the present disclosure.

Referring now to FIG. 3B, one exemplary merchant device 350 is presented. The exemplary merchant device 350 includes: a merchant-client interface 352, a processor subsystem 354, a non-transitory computer readable medium (memory subsystem) 356, and a network interface 358. As used herein, the term "merchant device" includes, but is not limited to, devices which are configured to transact and/or query a server (e.g., backend server 106) corresponding to a VME (e.g., to determine if a transaction should be allowed, etc.). It will be appreciated that the use of the term "merchant" in no way is intended to limit this definition to devices owned or operated by entities buying or selling anything. Rather, this term is more broadly intended to include, without limitation, an apparatus configured or enabled for transaction processing, whether that transaction be for goods, services, virtual consideration, obtaining or depositing funds or credit, redemption of coupons, etc. Common examples of a merchant device include, without limitation: kiosks, teller machines (e.g., ATMs), "cash" registers, mobile checkout readers (e.g., RFID or bar-code based), mobile wireless tablets, and even smartphones. Moreover, while merchant devices have historically been special purpose type devices, it is appreciated that a growing population of customer electronics devices are now so enabled to facilitate small business concerns (e.g., wireless-enabled cellular telephones, smartphones, personal computers (PCs), handheld computers, PDAs, personal media devices (PMDs), wireless tablets, "phablets", etc.), whether at time of manufacture, or provisioned afterwards by e.g., a third party, or users of the devices themselves.

The processor subsystem 354 can include one or more of a digital signal processor, microprocessor, field-programmable gate array, or plurality of processing components mounted on one or more substrates. The processor subsystem 354 can also include an internal cache memory. The processor subsystem 354 is in communication with the memory subsystem 356, the latter including memory which can, for example, comprise SRAM, flash, and/or SDRAM components. The memory subsystem 356 can implement one or a more of DMA type hardware, so as to facilitate data accesses as is well known in the art. The memory subsystem 356 of the exemplary embodiment contains computer-executable instructions which are executable by the processor subsystem 354.

In one exemplary embodiment, the merchant device 350 includes one or more interfaces, e.g., merchant-client interface 352, adapted to connect to a client device. The merchant-client interface 352 can be a wireless interface or alternately a physical interface (wired). Wireless interfaces can include "touch" type interfaces which have operating ranges up to a few centimeters (e.g., RFID, NFC, etc.) to more powerful wireless interfaces such as e.g., GSM, CDMA, UMTS, LTE/LTE-A, WiMAX, Wi-Fi, Bluetooth, Wireless USB, etc., or any combinations of the foregoing. For example, the merchant device 350 can include a short-range NFC interface, as well as a longer-range Wi-Fi interface, and even a WiMAX, satellite, or cellular interface. Common examples of physical interfaces include e.g., USB, FireWire, Thunderbolt, etc. In some variants, the merchant-client interface 352 can be implemented as a card reader or smart card receptacle (e.g., to maintain compatibility with existing legacy cards, etc.).

In some embodiments, the merchant device 350 can also include other components such as, e.g., a user interface subsystem that includes any number of well-known I/O including, without limitation: a keypad, a touch screen (e.g., multi-touch interface), an LCD, a backlight, a speaker, and/or a microphone. It is recognized that in certain applications, a user interface may be unnecessary. For example, simple card reader merchant devices may lack a user interface.

In the illustrated embodiment, the merchant device 350 includes a network interface 358 configured to securely report a transaction with one or more VMEs to an asset broker. In some variants, each transaction may additionally be stored within a secure file system for future reference/bookkeeping. Common examples of a network interface include, without limitation: Ethernet, Digital Subscriber Line (DSL), Cable, Hybrid Fiber Coaxial, wireless local area network (WLAN), cellular data connections, etc.

In some embodiments, the merchant device 350 can have associated device cryptographic keys or other cryptographic capabilities, such as without limitation Advanced Encryption Standard (AES)/Data Encryption Standard (DES) encryption, Internet Protocol security (IPSec), Multimedia Internet Keying (MIKEY), Secure Sockets Layer (SSL)/Transport Layer Security (TLS). These device keys (and/or other features) can be used to secure exchanges. In one such variant, the cryptographic keys are an asymmetric public/private key pair. In still other variants, the cryptographic keys are a symmetric key pair. In other variants, the merchant device 350 can have cryptographic keys for verifying and/or issuing digital certificates. Moreover, an NFC interface (where used) can have encryption applied thereto, such as to encrypt sensitive user or payment information during transmission.

During an exemplary client-merchant transaction, the merchant device 350 performs a transaction with an associated one or more VMEs. For example, the merchant device 350 can receive (or request) a client device's virtual credit card in exchange for a good/service. The received information can additionally incorporate, e.g., an amount to be transacted, validity check information, cryptographic protection, attestation information (e.g., time/date and location of transaction), merchant ID, etc. In other embodiments, the merchant device 350 can report back to the client device, e.g., an amount transacted, if the transaction was successful, payment source used, merchant ID, etc.

During an exemplary merchant device-asset broker transaction, the merchant device 350 reports the transaction to an asset broker. This can include reporting information associated with the client device's VME, the merchant account to credit/debit, etc., and an amount to transact. In response, the asset broker acknowledges that the amount has been successfully (or unsuccessfully) transferred from a corresponding account of the client device to a merchant device's account.

Figure 4:
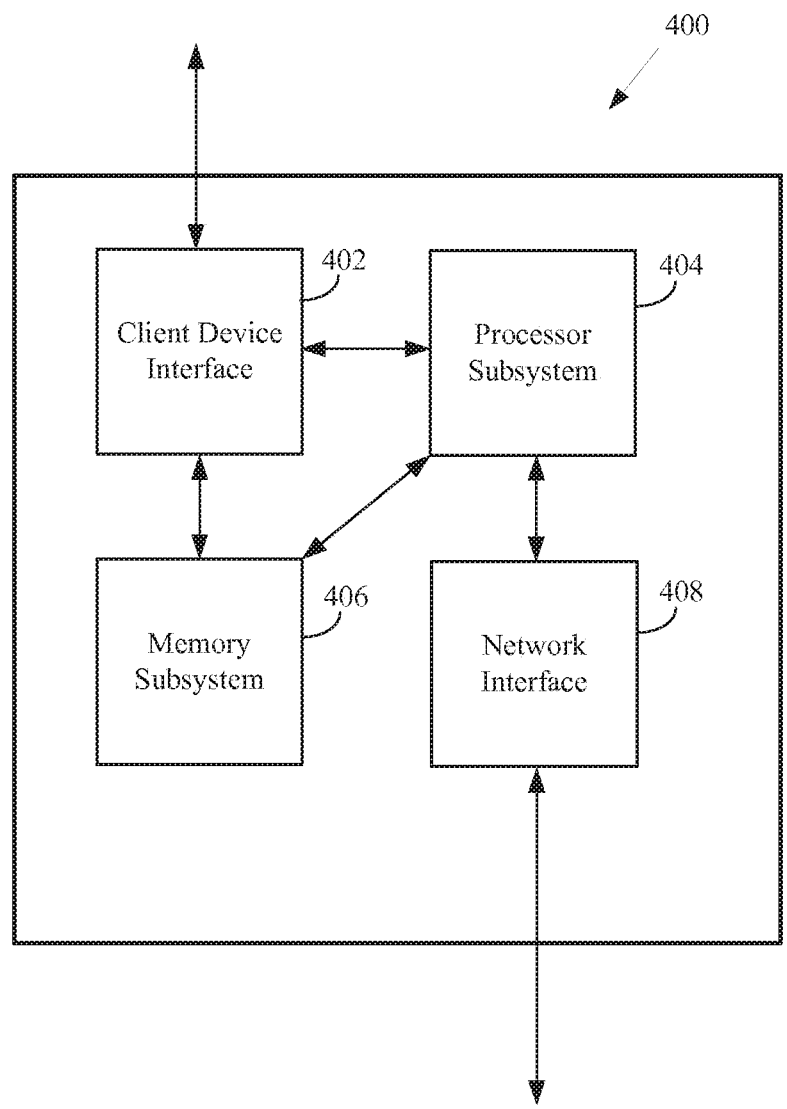
FIG. 4 is a logical block diagram of one exemplary embodiment of an asset agent, in accordance with the present disclosure.

Referring now to FIG. 4, one exemplary asset agent 400 is presented. The exemplary asset agent 400 includes: a client device interface 402, a processor subsystem 404, a non-transitory computer readable medium (memory subsystem) 406, and a network interface 408. As used herein, the term "asset agent" includes, but is not limited to entities which are configured to distribute VMEs. Common examples of VMEs include, without limitation: device manufacturers, third party resellers, etc.

The processor subsystem 404 can include one or more of a digital signal processor, microprocessor, field-programmable gate array, or plurality of processing components mounted on one or more substrates. The processor subsystem 404 can also include an internal cache memory. The processor subsystem 404 is in communication with the memory subsystem 406, the latter including memory which can, for example, include SRAM, flash, and/or SDRAM components. The memory subsystem 406 can implement one or a more of DMA type hardware, so as to facilitate data accesses as is well known in the art. The memory subsystem 406 of the exemplary embodiment contains computer-executable instructions which are executable by the processor subsystem 404.

In one exemplary embodiment, the asset agent 400 includes one or more interfaces, e.g., the client device interface 402, adapted to connect to a client device. The client device interface 402 can be a wireless interface or alternately a physical interface (wired). Wireless interfaces can include e.g., GSM, CDMA, UMTS, LTE/LTE-A, WiMAX, Wi-Fi, Bluetooth, Wireless USB, etc. Common examples of physical interfaces include e.g., USB, FireWire, Thunderbolt, etc.

In the illustrated embodiment, the asset agent 400 includes a network interface 408 configured to securely report distribution of one or more VMEs with an asset broker. Common examples of a network interface include, without limitation: Ethernet, DSL, Cable, Hybrid Fiber Coaxial, WLAN, cellular data connections, etc.

In some embodiments, the asset agent 400 can have associated device cryptographic keys. These device keys can be used to secure exchanges. In one such variant, the cryptographic keys are an asymmetric public/private key pair. In still other variants, the cryptographic keys are a symmetric key pair. In other variants, the asset agent 400 can have cryptographic keys for verifying and/or issuing digital certificates.

In one exemplary embodiment, the asset agent 400 has a database of VMEs that are not a priori associated with secure elements (i.e., associated with client devices having secure elements), etc. As described in greater detail hereinafter, a VME can be associated with a secure element by the asset agent according to the L2 security layer. The L2 security layer prevents VMEs from being "cloned" when they are delivered.

For example, in one implementation, a client device requests and is pre-loaded with a number of "challenges"; each challenge is used by to verify that the request is valid and current (e.g., not replayed from a previous request). More specifically, each challenge is a one-time use challenge that is the only valid challenge for a secure element of the client device; i.e., once the challenge is consumed, only the next challenge is valid for the secure element. As the user signs up for various accounts, a VME is provisioned by the asset agent 400. When the client device has depleted a reserve of challenges, the user can instruct the client device to request a new set of challenges. In some variants, the transfer of VMEs is performed over a secure link e.g., via a service kiosk, via a personal computer (PC) over a virtual private network (VPN) connection, etc.

Figure 5:
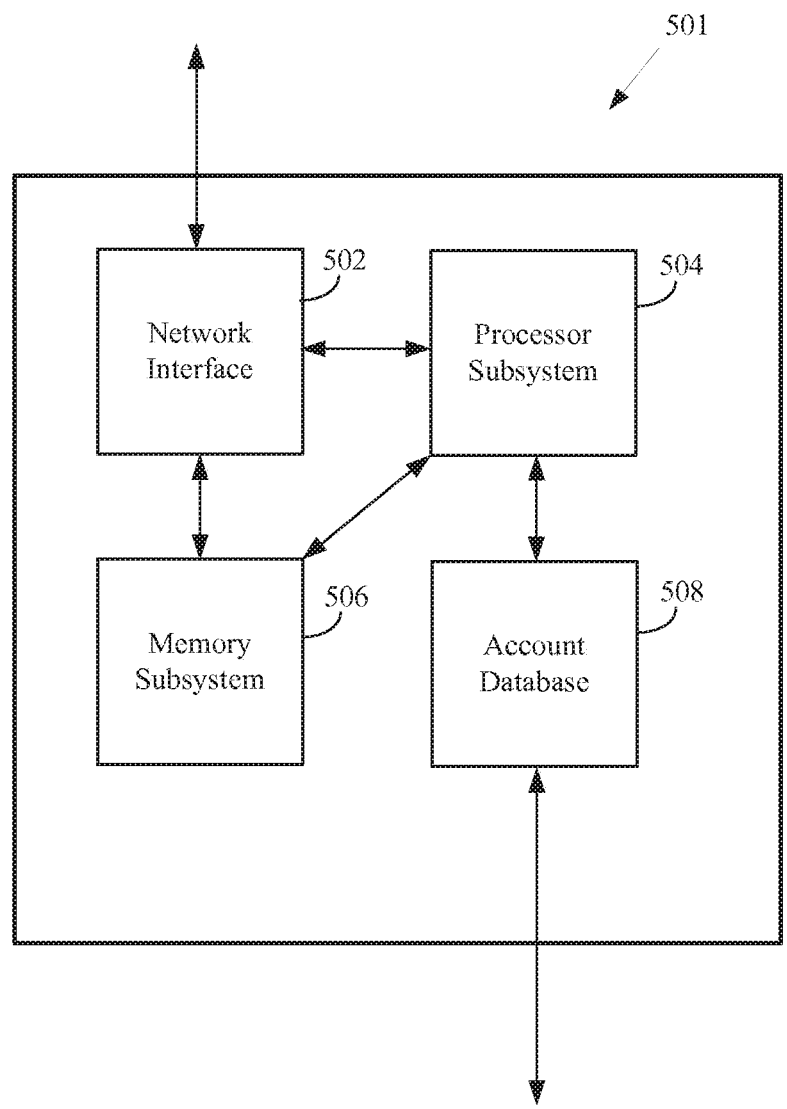
FIG. 5 is a logical block diagram of one exemplary embodiment of an account server of an asset broker, in accordance with the present disclosure.

Referring now to FIG. 5, one exemplary account server 501 of the asset broker 500 is presented. The exemplary account server 501 includes: a network interface 502, a processor subsystem 504, a non-transitory computer readable medium (memory subsystem) 506, and an account database 508. As used herein, the term "asset broker" includes, but is not limited to, systems and networks which are configured to appropriately debit, credit, and/or validate an account associated with a VME. Said systems can include one or more account servers, e.g., account server 501. Therefore it is understood that references to an "asset broker," can also refer to one or more account servers of an asset broker and vice-versa.

The processor subsystem 504 can include one or more of a digital signal processor, microprocessor, field-programmable gate array, or plurality of processing components mounted on one or more substrates. The processor subsystem 504 can also include an internal cache memory. The processor subsystem 504 is in communication with the memory subsystem 506, the latter including memory which can, for example, include SRAM, flash, and/or SDRAM components. The memory subsystem 506 can implement one or a more of DMA type hardware, so as to facilitate data accesses as is well known in the art. The memory subsystem 506 of the exemplary embodiment contains computer-executable instructions which are executable by the processor subsystem 504.

In one exemplary embodiment, the account server 501 includes a network interface 502 adapted to establish a network connection to client devices and merchant devices. Common examples of a network interface include, without limitation: Ethernet, DSL, Cable/Hybrid Fiber Coaxial, WLAN, wireless metropolitan area network (WMAN), cellular data connections, millimeter wave, etc.

In some embodiments, the account server 501 can have associated cryptographic keys. These keys can be used to secure messaging exchanges. In one such variant, the cryptographic keys are an asymmetric public/private key pair. In still other variants, the cryptographic keys are a symmetric key pair. In other variants, the account server 501 can have cryptographic keys for e.g., verifying and/or issuing digital certificates.

In one exemplary embodiment, the account server 501 is configured to authenticate and authorize VMEs for customer accounts. The VMEs are associated by the account server 501 according to the L3 security layer. The L3 security layer verifies that the customer account VME combination is authentic and authorized (i.e., not fraudulent, or misused).

Figure 6:
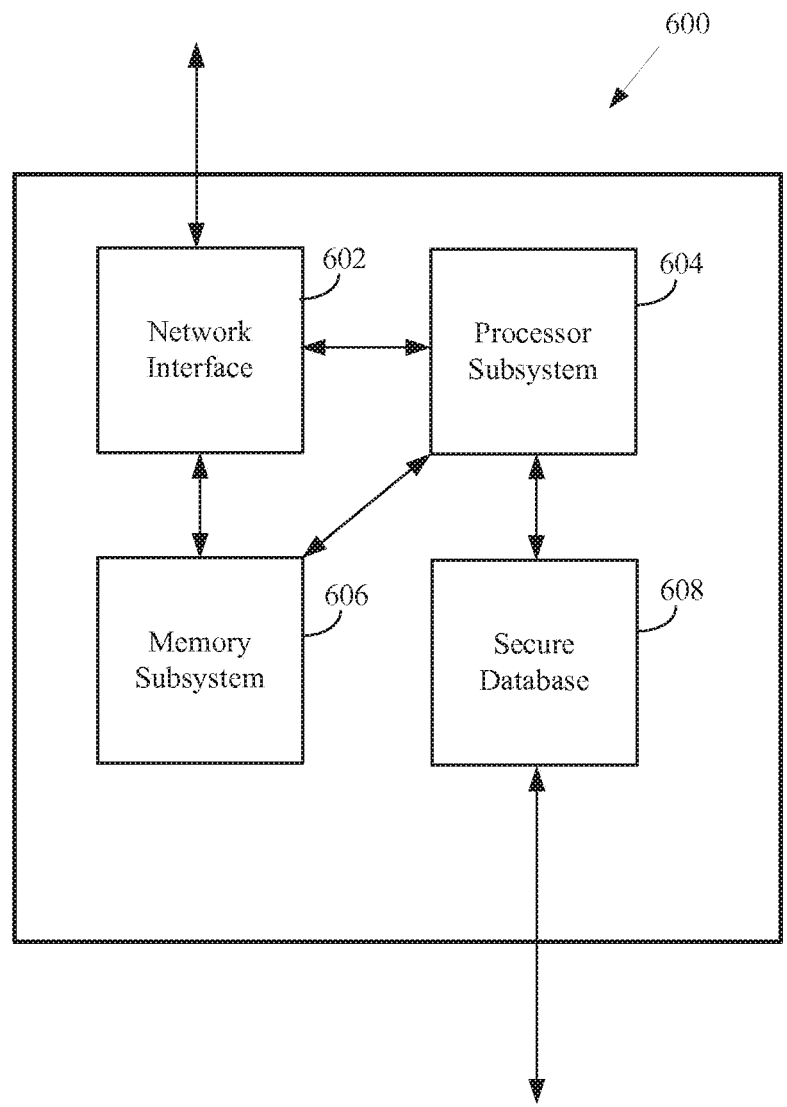
FIG. 6 is a logical block diagram of one exemplary embodiment of an asset locker, in accordance with the present disclosure.

Referring now to FIG. 6, one exemplary asset locker 600 is presented. The exemplary asset locker can include: a network interface 602, a processor subsystem 604, a non-transitory computer readable medium (memory subsystem) 606, and a secure database 608. As used herein, the term "asset locker" includes, but is not limited to devices which are configured to store, encrypt, and generate VMEs. For example, the asset locker 600 can be a trusted security module (TSM).

The processor subsystem 604 can include one or more of a digital signal processor, microprocessor, field-programmable gate array, or plurality of processing components mounted on one or more substrates. The processor subsystem 604 can also include an internal cache memory. The processor subsystem 604 is in communication with the memory subsystem 606, the latter including memory which can, for example, include SRAM, flash, and/or SDRAM components. The memory subsystem 606 can implement one or a more of DMA type hardware, so as to facilitate data accesses as is well known in the art. The memory subsystem 606 contains computer-executable instructions which are executable by the processor subsystem 604, although other types of computerized logic (e.g., combinations of hardware and software/firmware) may be used as well.

In one exemplary embodiment, the asset locker 600 includes a network interface 602 adapted to establish a network connection to one or more account servers. Common examples of a network interface include, without limitation: Ethernet, DSL, Cable, Hybrid Fiber Coaxial, WLAN, cellular data connections, etc.

In some embodiments, the asset locker 600 can have associated cryptographic keys. These keys can be used to secure messaging exchanges. In one such variant, the cryptographic keys are an asymmetric public/private key pair. In still other variants, the cryptographic keys are a symmetric key pair. In other variants, the asset locker 600 can have cryptographic keys for verifying and/or issuing digital certificates.

The asset locker 600 is further configured provide and/or generate one or more VMEs. In one exemplary embodiment, the VMEs are generated in compliance with a particular standard (e.g., the American National Standards Institute (ANSI) Standard X4.13-1983 (incorporated herein by reference in its entirety)), and stored within the secure database 608. Alternately, the VME can be constructed according to, e.g., proprietary or use-specific formats. Those of ordinary skill in the related arts will readily appreciate the plethora of possible formats, given the contents of the present disclosure.

In one exemplary embodiment, the asset locker 600 is configured to encrypt a VME for a secure element of a client device. The asset locker 600 facilitates that each asset is only transferred while encrypted, according to the L1 security layer. The L1 security layer facilitates that a VME only exists in plaintext (unencrypted) within either the asset locker 600 or a client device's secure element.

Figure 7:
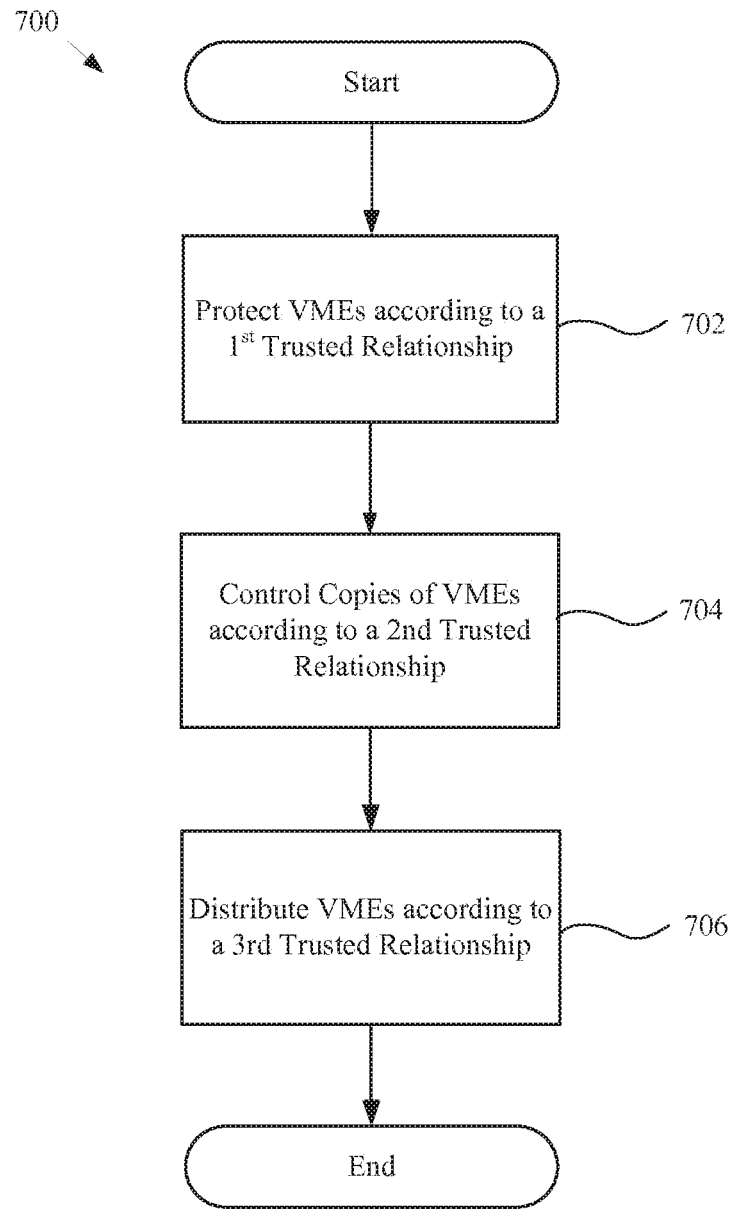
FIG. 7 is a logical flow diagram of one embodiment of a generalized method for distributing assets, in accordance with the present disclosure.

Referring now to FIG. 7, one embodiment of a generalized method 700 for distributing VMEs within a system is disclosed. At step 702, the contents of one or more VMEs are protected according to a first standard trusted relationship. In one exemplary embodiment, the first trusted relationship is configured to protect the secrets and/or cryptographic materials contained within the VME (e.g., secure keys, cryptographic material, user history, etc.). For example, the first trusted relationship is based on a security module (implemented within hardware or software) that is configured to encrypt or decrypt VMEs according to unique device keys and endorsement certificates. In particular, the security module is configured to encrypt VMEs for delivery to a desired destination device (e.g., a client device or merchant device) that is compliant with the first trusted relationship, or decrypt access control clients received from a source device that is compliant with the first trusted relationship. In one exemplary embodiment, all VMEs must be encrypted when being transferred between devices (i.e., VMEs cannot be transferred to any other device in an unencrypted form). Each device at the first trusted relationship level is given unique device keys and endorsement certificates which can be used to securely transfer VMEs.

Various implementations of the first standard trusted relationship can also be physically and/or logically protected. For example, the first standard trusted relationship can include protection within a Hardware Security Module (HSM) configured to destroy itself if forcibly opened/accessed. More generally, the exemplary embodiment of the first standard trusted relationship minimally protects a trusted boundary. Common examples of a trusted boundary include both physical boundaries (e.g., physical isolation, etc.), and/or logical boundaries (e.g., encrypted communication, etc.).

At step 704, the number of copies of a VME is controlled according to a second standard trusted relationship. In one exemplary embodiment, the second trusted relationship is configured to prevent accidental and/or malicious cloning of a VME (conservation enforcement). For instance, the second standard trusted relationship can be managed by a security module configured to encrypt a VME for itself or another device. Similarly, the security module can encrypt a VME such that it may only be decoded by another specific device (for example, based on an asymmetric cryptographic key). In some embodiments, security module encryption scheme can be based on an asymmetric key pair; or alternately, the security module encryption scheme can use a symmetric key pair.

As previously noted, a public/private key pair is based on a secret private key, and a publishable public key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The RSA algorithm is one type of public/private key pair cryptography that is commonly used within the related arts, but it will be recognized that the embodiments described herein is in no way limited to the RSA algorithm (or for that matter asymmetric or symmetric key pairs).

Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

At step 706, the VME is distributed to destination devices for use according to a third trusted relationship. The third trusted relationship requires entity authentication and authorization. More directly, the third trusted relationship ensures that a VME is only transmitted to an entity that can authenticate their identity, and is authorized for the VME.

Due to the flexibility of distribution models, many different schemes are envisioned, and will be recognized by those of ordinary skill when provided the present disclosure. Several a VME distribution schemes that are illustrative of the broad variety of schemes suitable for operation in accordance with various aspects of the present invention are disclosed in greater detail hereinafter.

Figure 8:
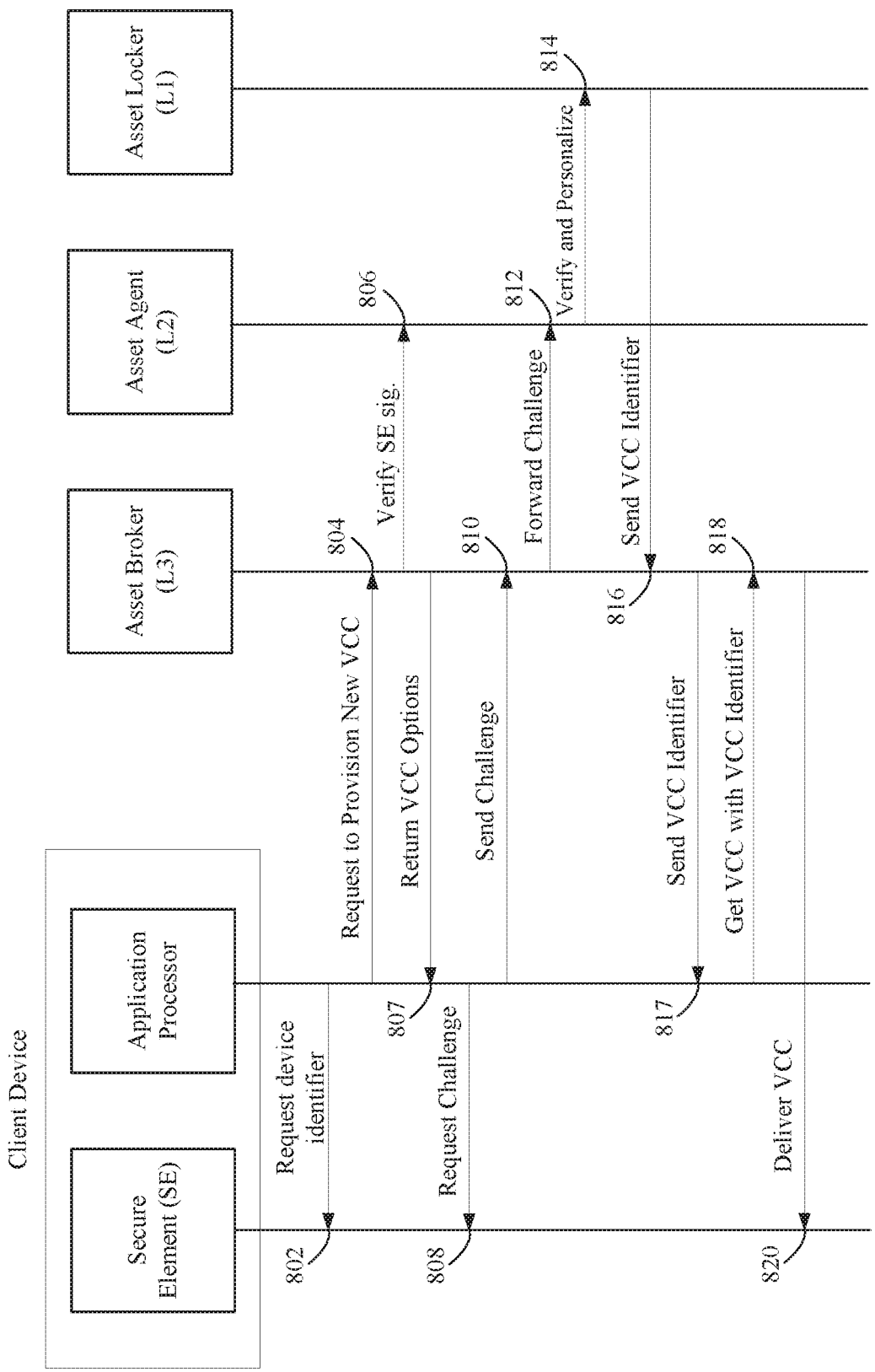
FIG. 8 is a logical ladder diagram representing an exemplary provisioning transaction, in accordance with the present disclosure.

Referring now to FIG. 8, a logical ladder diagram representing one exemplary embodiment of a provisioning transaction is illustrated. The provisioning transaction can be carried out by a client device, an asset broker, an asset agent, and an asset locker. The client device includes a secure element (SE) and application processor (AP) (e.g., processor subsystem 304). The SE can store software that includes a so-called "stack" of software layers that facilitates transactions in accordance with the present disclosure. Each software layer is responsible for a set of hierarchical functions which are negotiated with its corresponding peer software layer. It is further appreciated that in some cases, the AP can be compromised (e.g., "jailbroken", etc.); consequently, the trust relationships exist only between the SE and the corresponding logical layer entity; i.e., the AP is not trusted.

The security software protocol includes an L1 layer, L2 layer, and L3 layer. L1 security performs encryption and decryption of VME data. L1 operations are limited to secure execution environments (e.g., an SE or TSM). Within L1, VME data can be stored in plain text (i.e., unencrypted) within the logical L1 boundary; outside of the logical L1 boundary, the VME data is securely encrypted. L2 security prevents VME data from being duplicated. The L2 boundary ensures that one and only one copy of a VME exists outside the L2 boundary. Within the L2 boundary multiple copies can exist. Moreover, L2 security can further embed a challenge into the encrypted VME data. Before installing a VME, a client device can compare the challenge embedded in the VME to a challenge stored on the client device to verify the VME is not stale (i.e., the VME is the current and only VME). L3 security is responsible for establishing trust, ownership, and verification of the customer who owns the VME. For each VME, the SE can store information to indicate ownership associated with the VME.

In one exemplary embodiment, the asset locker is a TSM that is configured to generate the data components of the VME and store the VMEs in bulk lots. The asset locker performs VME operations in accordance with L1 security, and ensures that only encrypted VMEs are transmitted (i.e., VMEs are not transmitted in unencrypted form outside of the asset locker). In order to provision a VME to a customer, the asset agent receives encrypted VMEs from the asset locker, and stores the VMEs to provision to client devices on an as needed basis. The asset agent performs VME operations in accordance with L2 security, and ensures that only one copy of the encrypted VME is provisioned to a client device. Lastly, the exemplary embodiment of the asset broker performs VME operations in accordance with L3 security and facilitates that the transmission of the encrypted VMEs only occurs to client devices with SEs that are authenticated and authorized. Once a VME has been delivered to the client device, the asset broker can associate the VME with an account associated with the client device and/or an account associated with a user of the client device.

In one embodiment, a software application stored in the client device requests that a new Virtual Credit Card (VCC) is provisioned to a user's account for use. The software application is executed with the AP. At 802, the AP requests information from the SE that uniquely identifies the client device or the SE. For example, the information can include a device identifier. AP transmits the device identifier in a request for a new VCC to the asset broker at 804. The asset broker authenticates the request to provision the VCC to the user's account. The authentication is based on the device identifier. In one aspect of the embodiment, the asset broker authenticates the request by determining that the SE/client device is associated with the user account.

The SE can encrypt the device identifier with a digital signature such that the device identifier is securely transmitted from the client device to the asset broker. Once the asset broker has authenticated/authorized the new VCC, the asset broker forwards the SE's digital signature to the asset agent. The asset agent verifies the SE's digital signature, thus uniquely identifying the destination SE for the VCC at 806. At 807, any additional VCC options are provided to the client device.

As a brief aside, so-called "challenges" are a critical resource used to associate a specific VME with an SE. Specifically; each SE maintains a certain number of challenges to maintain L2 security. By verifying that a challenge is valid, the SE can be sure that the VME is not a "stale" VME (i.e., an invalid or otherwise unusable duplicate). The SE deletes a challenge when a VME with a matching challenge data is received. Consider the following implementation, an SE creates (or is given) a number of challenges which are shared with the asset agent. Subsequently thereafter, the asset agent can embed the current challenge in a VME that has been provisioned for the SE. When the SE receives a VME, the SE can verify that the received VME contains the appropriate challenge and is not stale.

One potential drawback of the foregoing scheme is that a fixed number of challenges can be easily compromised with a denial of service (DOS) attack. In a DOS attack, an SE is continuously triggered to generate challenges until all of its challenge resources are exhausted. To these ends, the exemplary embodiment of the SE additionally performs a session handshake with the asset broker/asset agent before processing requests that would trigger the SE to consume a challenge. Additionally, in the unlikely case that resources are exhausted and the SE is unable to create new challenges, the SE can store a separate set of reserved challenges specifically designated for freeing up another set of challenges. In some cases, the SE can also include an Original Equipment Manufacturer (OEM) credential, which the OEM can use to further control challenge operation.

At 808, the AP requests that the SE provides a challenge for association with the VCC. Once provided by the SE, the challenge is sent to the asset broker at 810 and then forwarded to the asset agent at 812. The asset agent verifies the challenge and then provides personalization information to the asset locker at 814. The asset locker personalizes a new VCC for the SE and provides an associated VCC identifier to the asset broker at 816. Next, the asset broker provides the VCC identifier to the AP at 817. Once the AP receives the VCC identifier, the AP can request delivery of the VCC at 818. Thereafter, the asset broker can provide the VCC to the SE of the client device at 820.

Those of ordinary skill in the related network arts will recognize that multiple practical issues arise during the operation of large scale distribution networks. Specifically, large scale distribution networks must be scalable to handle large bursts of traffic (such as can occur on a so-called "launch day" of a client device). One scheme for reducing overall network traffic entails postponed delivery of VMEs (when possible).

Figure 9A:
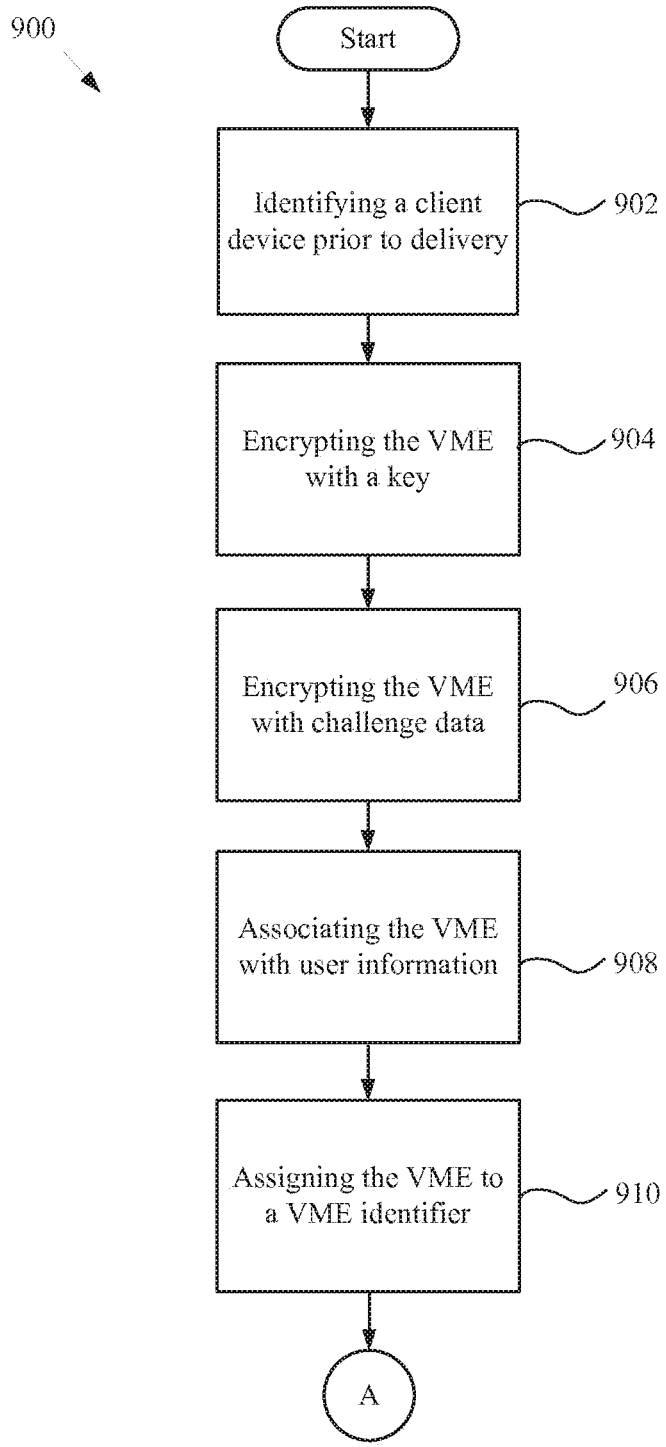
FIGS. 9A and 9B show a logical flow diagram of another embodiment of a generalized method for distributing assets, in accordance with the present disclosure.
Figure 9B:
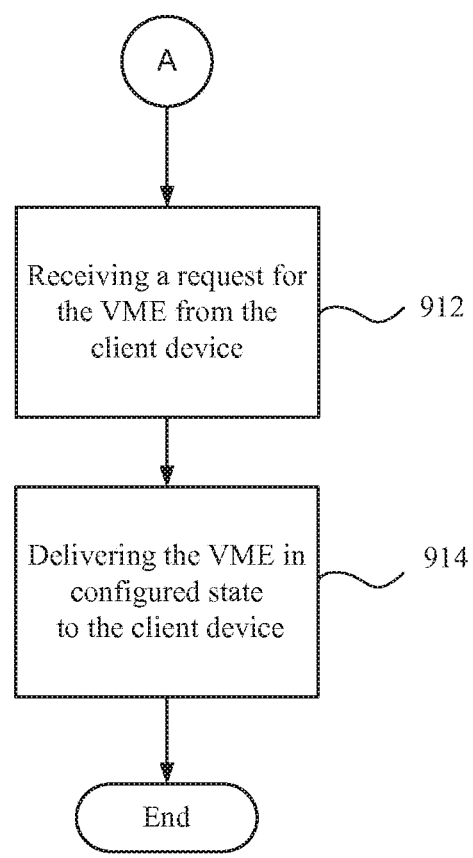

Referring to FIGS. 9A and 9B, one embodiment of a generalized method 900 for distributing VMEs within a system is disclosed. During a pre-personalized operation, a so-called "pre-personalized" client device having an SE is pre-assigned a VME prior to shipment (i.e., when a user purchases a device at a store, orders the device online, etc.). At 902, before the client device is delivered to the user, a sticker, label or other indicia disposed on a box associated with the client device is scanned. For example, the box can be the retail packaging the client device is enclosed in. This sticker contains information (e.g., a device identifier) that uniquely identifies the client device and that can be associated with the VME. The VME can be pre-configured for the client device by, for example, (i) encrypting the VME with a key specific to the SE (L1) (determined from the sticker) at 904, (ii) embedding a specified initial challenge in the VME (L2) at 906, and (iii) associating the VME with the user's authentication/authorization information (L3) (determined at time of purchase) at 908. The VME is then assigned to an identifier that uniquely identifies the VME, e.g., a VME identifier, at 910. Thereafter, the client device can request the VME using the VME identifier at 912. At 914, upon receiving the request and VME identifier, the VME can be delivered to the client device in its completely configured state.

The foregoing scheme efficiently pre-configures a VME based on information gleaned from the client device (and/or a box associated with the client device) and information from the user at the time of purchase. The VME is configured while the device is in transit (e.g., shipped, taken home, etc.) according to a best effort basis (i.e., the configuration occurs as resources are available). Thereafter, the VME can be loaded into the client device seamlessly from a cached location, without requiring real-time traffic. In order to maximize system reliability, the pre-configured VME can also be cached in multiple, geographical locations in a redundant manner; i.e., where multiple data centers across different geographical locations have duplicate VMEs (L2 security provides an initial challenge scheme such that once the first copy of the VME is retrieved, the duplicates are stale).

More directly, unlike conventional manufacturing schemes, the exemplary embodiment of the client device is not manufactured and pre-programmed with a VME. Configuration and delivery of the VME can be "postponed" until after the client device has been manufactured and/or deployed. For example, if multiple VMEs can be supported by the client device, then the client device can have generic software which can be later configured with a selected VME when the user has activated an account. In some implementations, the generic software can include a generic or default VME. In this implementation, when a user purchases the client device, the user may be allowed (or required) to provide a credit card account (or similar) for use with the default VME. Thereafter, once the client device is activated, the default VME is automatically loaded as a part of the activation sequence.

Figure 10A:
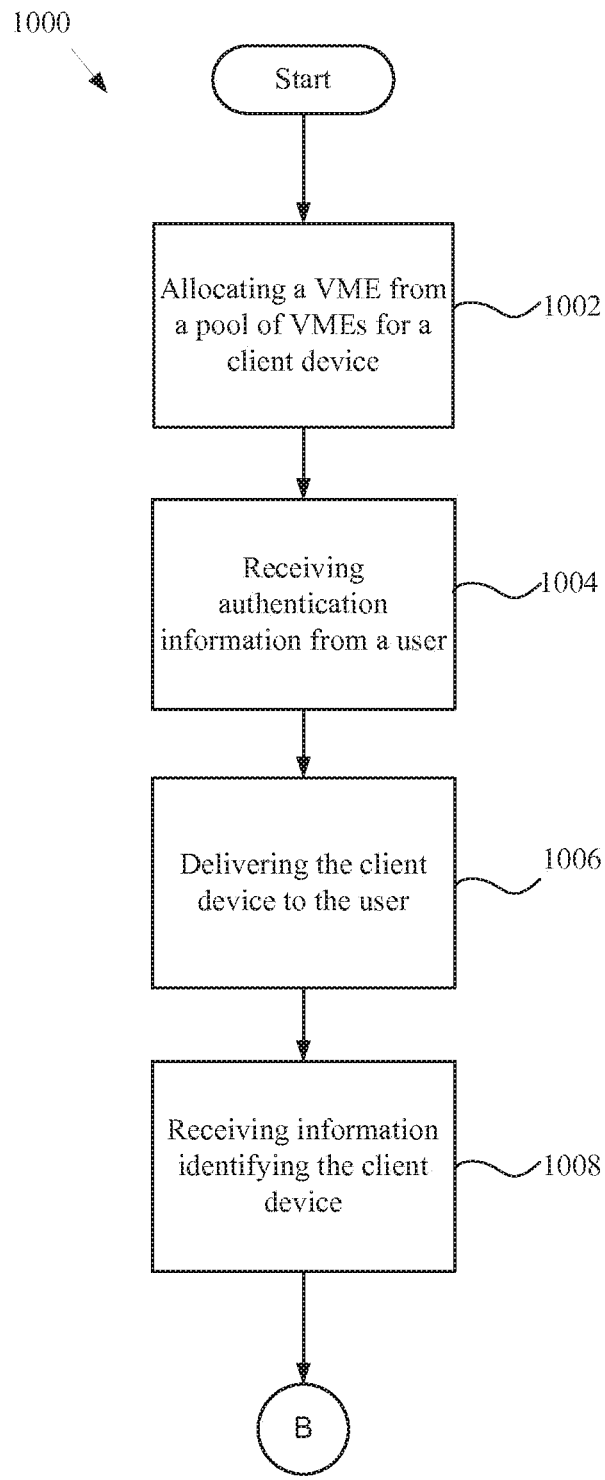
FIGS. 10A and 10B show a logical flow diagram of another embodiment of a generalized method for distributing assets, in accordance with the present disclosure.
Figure 10B:
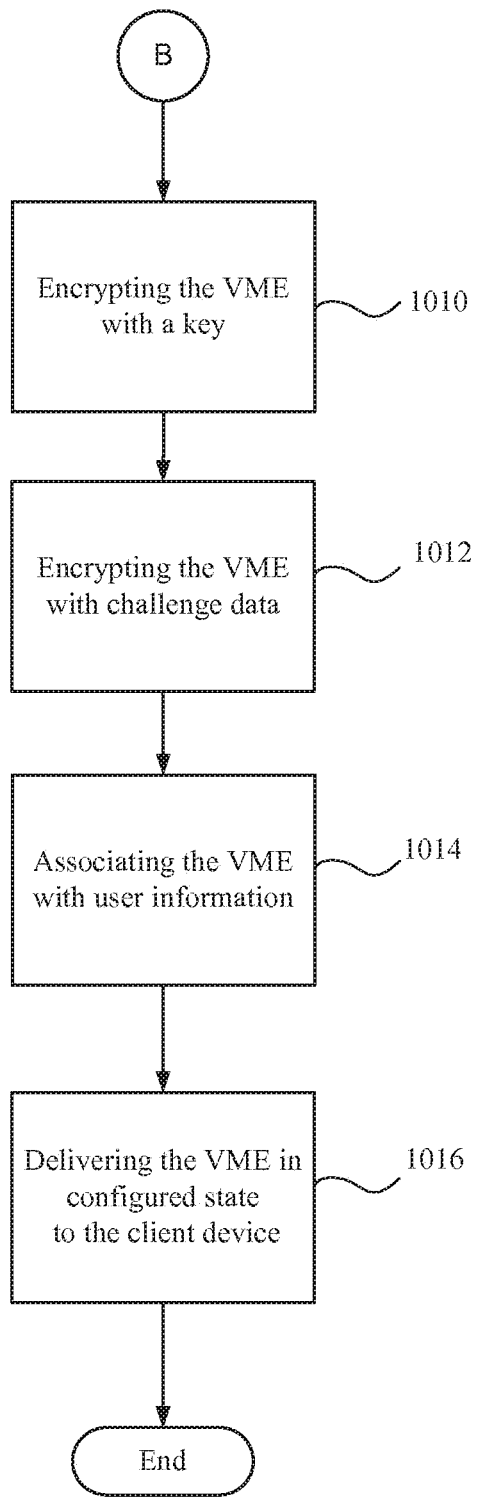

Referring to FIGS. 10A and 10B, another embodiment of a generalized method 1000 for distributing VMEs within a system is disclosed. In this variant, a client device having an SE is allocated a VME at shipment (i.e., when a user purchases a device at a store, orders the device online, etc.) from a pool of VMEs at 1002; i.e., a specific VME is not associated with the client device. At this time, the user can provide authentication/authorization information at 1004. Once the client device is delivered to the user at 1006, information uniquely identifying the client device is input by, e.g., the point of sale merchant, the user at home, etc. The information can be gleaned from a sticker, label or other indicia disposed on a box associated with the client device. The information can also indicate that a VME should be allocated for the client device but that one has not already been assigned. Responsive to receiving the information at 1008, the asset broker, asset agent, and asset broker coordinate to allocate an available VME by: encrypting the VME with a key specific to the SE (L1) (determined from the sticker) at 1010, embedding challenge data in the VME (L2) at 1012, and associating the VME with a user's authentication/authorization information (L3) (determined at time of purchase) at 1014. At 1016, the newly created and encrypted VME is delivered to the client device in its completely configured state.

The foregoing scheme efficiently configures a VME on an as-needed basis. Such implementations allow the asset broker and/or asset agent to intelligently manage a pool of VMEs. Because each VME in the pool of VMEs is not assigned to a specific client device (i.e., dedicated to a specific use) and is assigned on an as-needed basis, the asset broker and/or asset agent do not have to track inventory which is not yet active (e.g., some devices may be purchased and returned before being activated, this reduces unnecessary VME "churn"). This can be useful in cases when a VME is a finite resource. Those of ordinary skill in the related arts will readily appreciate that an account number is a finite resource (and thus precious in its scarcity); for example, the ANSI Standard X4.13-1983 (previously incorporated herein by reference in its entirety) is an account numbering system used by most national credit-card systems. According to the ANSI Standard X4.13-1983 of sixteen (16) digits of a credit card number, only a subset of those represent an actual account number (e.g., eight (8) digits can only be used to represent up to 10 million unique account numbers); the other digits are ascribed to other uses (e.g., identifying the card issuer, providing a "check" value, identifying a card number, etc.).

Figure 11:
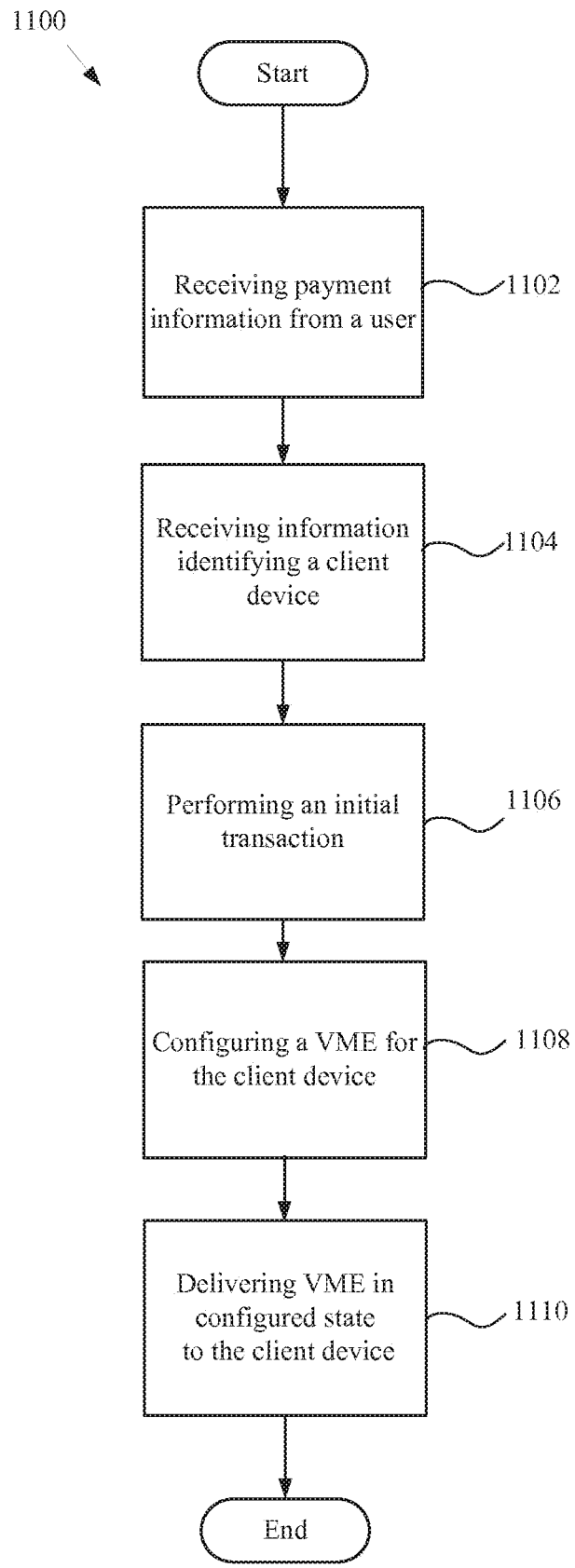
FIG. 11 is a logical flow diagram of another embodiment of a generalized method for distributing assets, in accordance with the present disclosure.

Referring now to FIG. 11, another embodiment of a generalized method 1100 for distributing VMEs within a system is disclosed. In this embodiment, the configuration of a VME can be completely postponed until after an initial transaction has occurred. This embodiment can be useful in cases where multiple transactions (e.g., periodic transactions) between a system and a client device will occur. For example, a user may opt to buy, e.g., a multiple movie pass, monthly bus pass, etc. At 1102, a user provides the system with payment information, e.g., credit card information. At 1104, information identifying a client device, e.g., a device identifier, is provided to the system. The device identifier can be provided in accordance with any of the aforementioned embodiments (e.g., "pre-personalization" process, input by a user, provided by an AP, etc.). An initial transaction can be performed normally at 1106. In the meantime, a VME is configured for the client device using the device identifier, provided payment information and/or challenge data; once the VME is configured at 1108 it is delivered to the client device for subsequent uses at 1110. In some cases, the delivery can be based on a push notification when ready, automatic download, or manual download.

Figure 12:
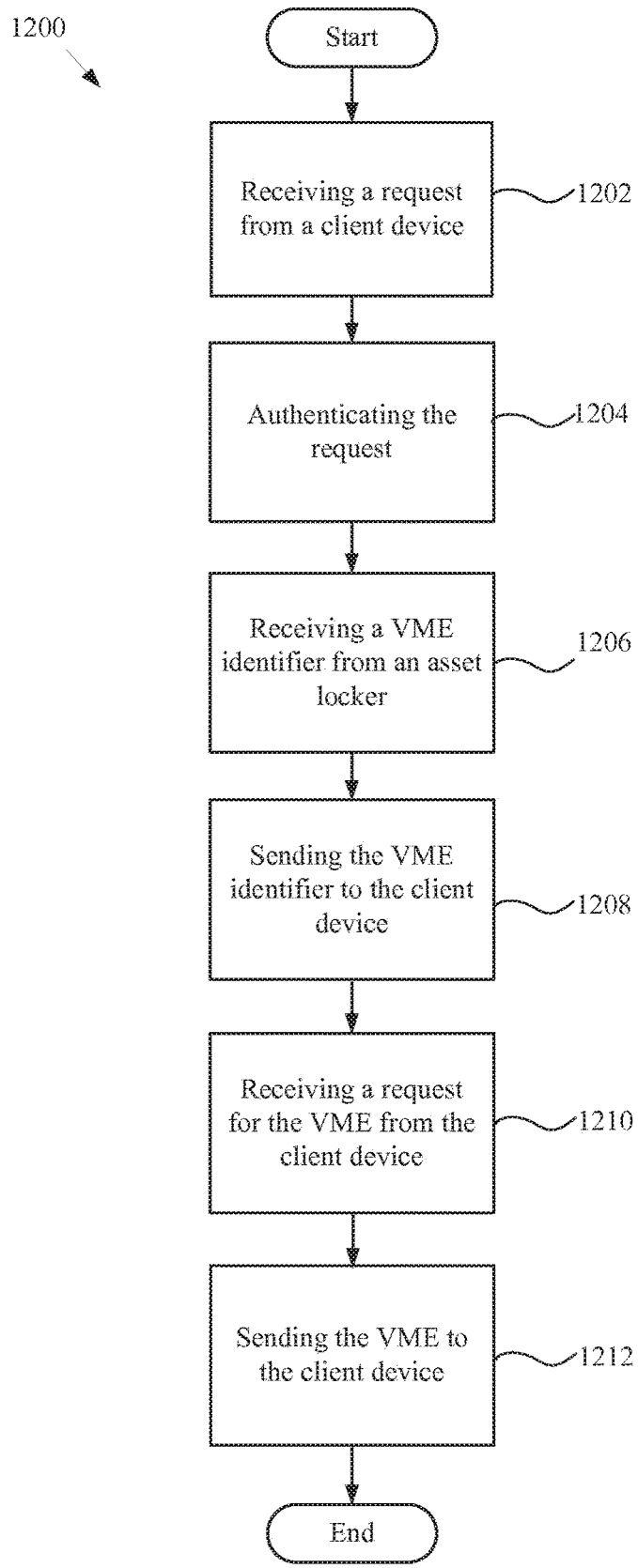
FIG. 12 is a logical flow diagram of another embodiment of a generalized method for distributing assets, in accordance with the present disclosure.

Referring now to FIG. 12, another embodiment of a generalized method 1200 for distributing a VME within a system is disclosed. The method 1200 can be carried out with an asset broker in communication with a client device having an SE, an asset agent and an asset locker. At 1202, the asset broker receives from the client device a request to provision a VME to a user's account for use. The account can be associated with a user of the client device (i.e., the account is owned by the user). The request can include identity information that is uniquely associated with the client device, e.g., a device identifier. In one aspect of the embodiment, the request can also include sending information identifying the account. Next, the asset broker authenticates the request at 1204. The asset broker can authenticate the request by verifying that the client device identified by the device identifier is associated with the account. The asset broker then coordinates with the asset agent and the asset locker to provision a VME for the account and configure the VME for the client device in accordance with the embodiments described herein. At 1206, the asset broker receives a VME identifier from an asset locker. The VME identifier identifies the VME that is configured for the client device. The asset broker can then send the VME identifier to the client device at 1208. The client device can store the VME identifier and subsequently use the VME identifier when requesting the configured VME from the asset broker. Upon receiving a request for the VME from the client device at 1210, the asset broker can send the configured VME to the client device at 1212.

Figure 13A:
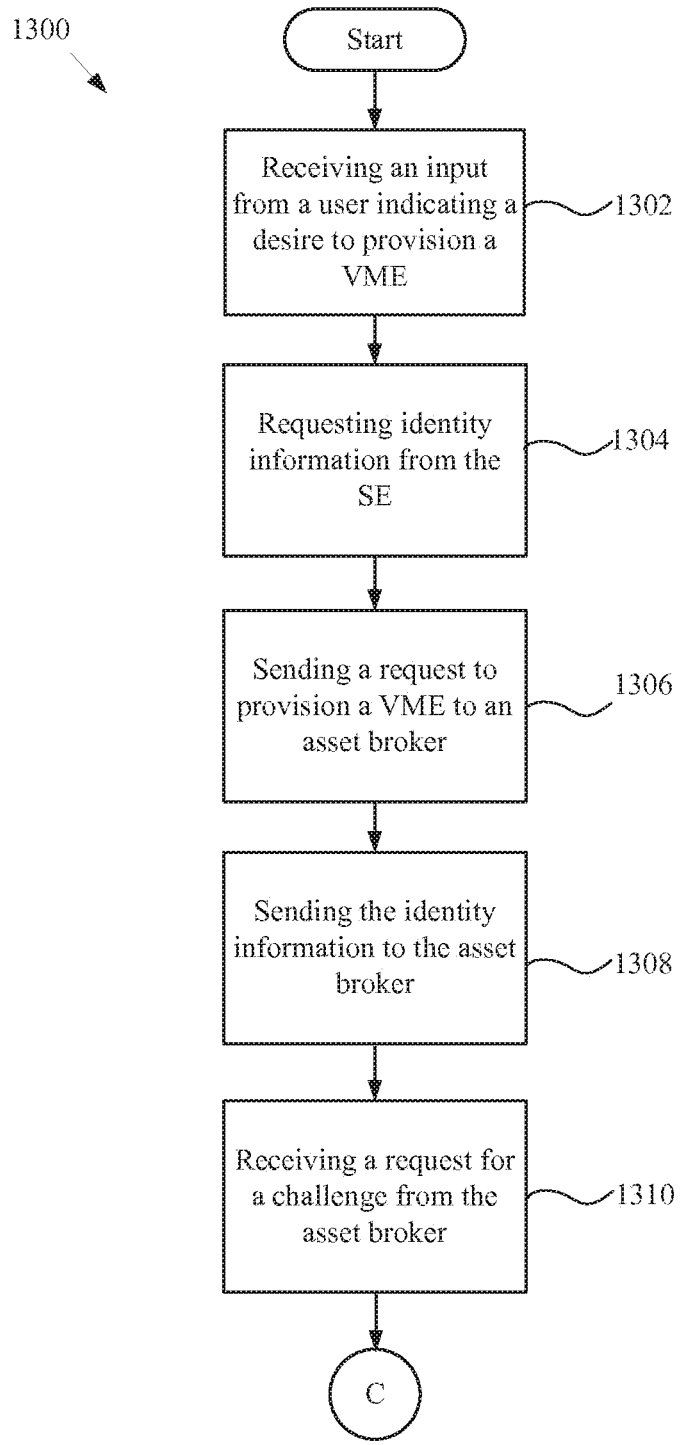
FIGS. 13A, 13B and 13C show a logical flow diagram of another embodiment of a generalized method for distributing assets, in accordance with the present disclosure.
Figure 13B:
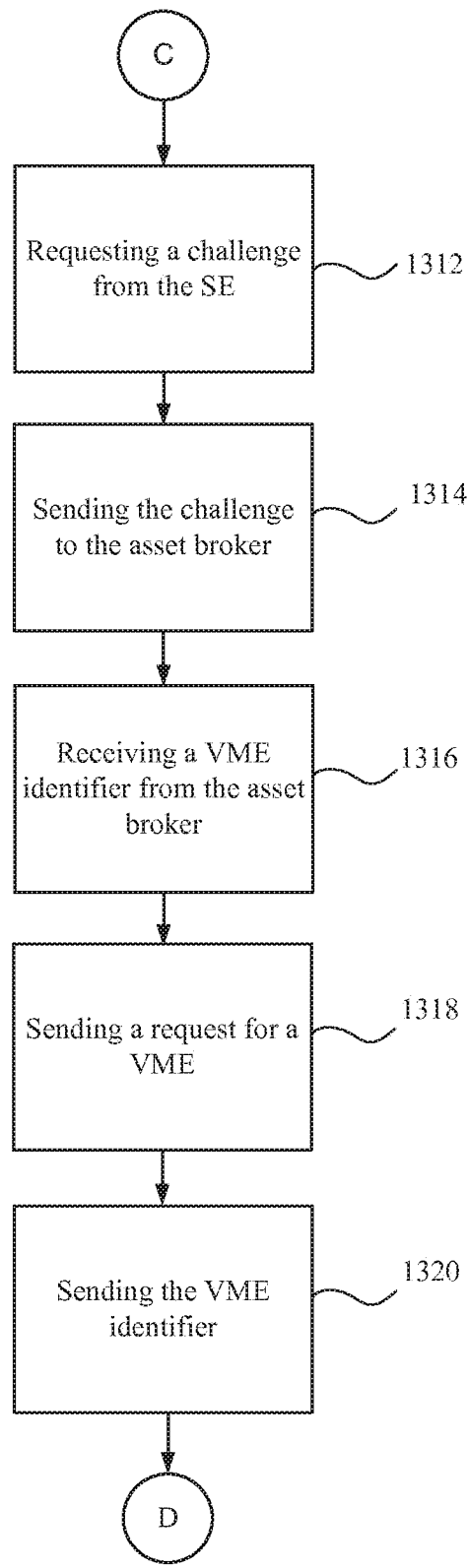
Figure 13C:
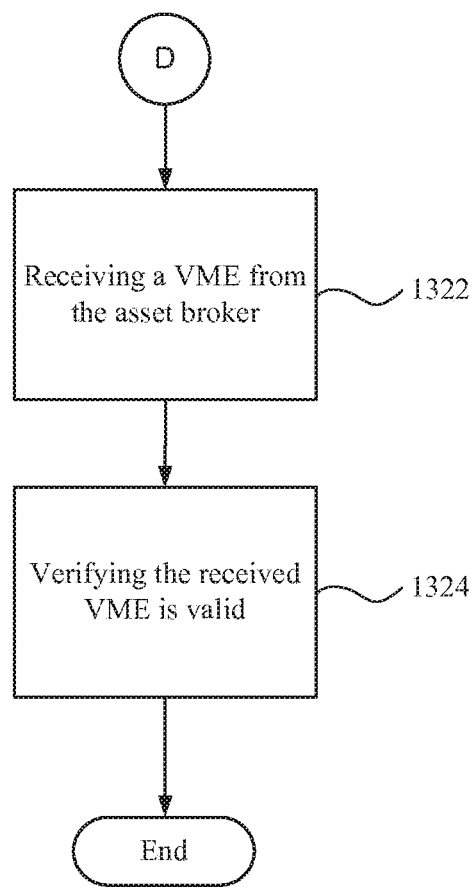

Referring now to FIGS. 13A-C, another embodiment of a generalized method 1300 for distributing a VME within a system is disclosed. The method 1300 can be carried out by a client device in communication with a provisioning system that can include an asset agent, an asset broker and/or an asset locker. The client device can include an SE and an AP. It should be noted the following describes the method 1300 carried out between a client device and an asset broker for the purpose of clarity and conciseness. It should be understood that the steps of method 1300 can also be carried out between the client device and one or more entities of the provisioning system (e.g., an asset agent, asset broker).

At 1302, the client device receives an input indicating a desire that a VME be provisioned to a user's account for use. The input can be entered by the user using an I/O interface at the client device (e.g., a button, keypad, touchscreen, voice command, etc.). At 1304, the client device can request identity information from the SE. The identity information is uniquely associated with the client device, e.g., a device identifier. The identity information can be obtained from the SE. In an alternative embodiment, the identity information can be obtained from a source that is external to the client device. For example, the user can obtain the identity information from a sticker on a box of the client device and input the identity information using an I/O device of the client device.

Upon receiving a device identifier from the SE, the client device can send a request to provision a VME to an asset broker at 1306. In addition to the request, the client device also sends the device identifier to the asset broker at 1308. At 1310, the client device receives a request for a challenge from the asset broker. The challenge can be used to verify VMEs in accordance with L2 security as described herein. In response to receiving the request from the asset broker, the AP can request a challenge from the SE at 1312. Upon receiving a challenge from the SE, the client device sends the challenge to the asset broker at 1314. The provisioning system can authenticate the request and configure a VME for the client device. Next, the client device can receive a VME identifier from the asset broker at 1316. The VME identifier can uniquely identify the VME that is configured for the client device. Subsequently, the client device can send a request for the configured VME to the asset broker at 1318. In addition to the request, the client device sends the VME identifier at 1320. In response to receiving the request and the VME identifier, the asset broker can deliver the configured VME to the client device at 1322. The SE can verify the received VME is valid (i.e., the received VME is not stale) by verifying that the received VME is embedded with valid challenge data at 1324.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

Furthermore, the various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   transmitting, by an application processor of a client device via a wireless interface to a remote server, a provisioning request for provisioning a virtualized medium of exchange (VME) to the client device;
   receiving, by the application processor of the client device via the wireless interface from the remote server, an asset identifier associated with the VME;
   transmitting, by the application processor of the client device via the wireless interface to the remote server, a delivery request for delivery of the VME, the delivery request comprising the asset identifier associated with the VME;
   obtaining, by the application processor of the client device from a secure element of the client device, a challenge value used to associate the VME with the secure element of the client device;
   transmitting, by the application processor of the client device via the wireless interface to the remote server, the challenge value;
   receiving, by the secure element of the client device via the wireless interface from the remote server, the VME, wherein the VME includes challenge data based on the challenge value; and
   verifying, by the secure element of the client device, the VME received from the remote server prior to installing the VME in the secure element, wherein the VME is verified based on the included challenge data.

2. The method of claim 1, further comprising the client device:
   executing a transaction with a merchant device to charge a user account associated with the VME.

3. The method of claim 1, wherein the VME comprises a virtual credit card.

4. The method of claim 1, wherein the provisioning request comprises identifying information verifying that the secure element is associated with an account corresponding to the VME.

5. The method of claim 1, wherein the VME is encrypted using a key unique to the secure element.

6. The method of claim 1, further comprising:
   prior to the receiving the VME:
      obtaining, by the application processor of the client device from the secure element, a device identifier corresponding to the client device; and
      transmitting, by the application processor of the client device via the wireless interface to the remote server, the device identifier with the provisioning request.

7. The method of claim 1, wherein the challenge value comprises a one-time-use value preloaded on the secure element.

8. A client device comprising:
a secure element comprising a secure processor coupled to a secure memory storing first instructions executable by the secure processor;
a wireless interface;
a memory; and
one or more processors coupled to the memory storing second instructions executable by the one or more processors, wherein execution of the first instructions by the secure processor and execution of the second instructions by the one or more processors, cause the client device to perform operations comprising:
transmitting, by an application processor of the one or more processors of the client device via the wireless interface to a remote server, a provisioning request for provisioning a virtualized medium of exchange (VME) to the client device,
receiving, by the application processor of the client device via the wireless interface from the remote server, an asset identifier associated with the VME;
transmitting, by the application processor of the client device via the wireless interface to the remote server, a delivery request for delivery of the VME, the delivery request comprising the asset identifier associated with the VME;
obtaining, by the application processor of the client device from the secure element of the client device, a challenge value used to associate the VME with the secure element of the client device;
transmitting, by the application processor of the client device via the wireless interface to the remote server, the challenge value;
receiving, by the secure element of the client device via the wireless interface from the remote server, the VME, wherein the VME includes challenge data based on the challenge value; and
verifying, by the secure element of the client device, the VME received from the remote server prior to installing the VME in the secure element, wherein the VME is verified based on the included challenge data.

9. The client device of claim 8, wherein the VME comprises a virtual credit card.

10. The client device of claim 8, wherein the operations further comprise:
executing a transaction with a merchant device to charge a user account associated with the VME.

11. The client device of claim 8, wherein the VME is encrypted using a key unique to the secure element.

12. The client device of claim 8, wherein the operations further comprise:
prior to the receiving the VME:
obtaining, by the application processor of the client device from the secure element, a device identifier corresponding to the client device; and
transmitting, by the application processor of the client device via the wireless interface to the remote server, the device identifier with the provisioning request.

13. The client device of claim 8, wherein the challenge value comprises a one-time use value preloaded on the secure element.

14. A non-transitory computer-readable storage medium storing instructions that, when executed by one or more processors of a client device, cause the client device to perform operations including:
transmitting, by an application processor of the one or more processors of the client device via a wireless interface of the client device to a remote server, a provisioning request for provisioning a virtualized medium of exchange (VME) to the client device;
receiving, by the application processor of the client device via the wireless interface from the remote server, an asset identifier associated with the VME;
transmitting, by the application processor of the client device via the wireless interface to the remote server, a delivery request for delivery of the VME, the delivery request comprising the asset identifier associated with the VME;
obtaining, by the application processor of the client device from a secure element of the client device, a challenge value used to associate the VME with the secure element of the client device;
transmitting, by the application processor of the client device via the wireless interface to the remote server, the challenge value;
receiving, by the secure element of the client device via the wireless interface from the remote server, the VME, wherein the VME includes challenge data based on the challenge value; and
verifying, by the secure element of the client device, the VME received from the remote server prior to installing the VME in the secure element, wherein the VME is verified based on the included challenge data.

15. The non-transitory computer-readable storage medium of claim 14, wherein:
the operations further include the client device executing a transaction with a merchant device to charge a user account associated with the VME; and
the VME comprises a virtual credit card.

16. The non-transitory computer-readable storage medium of claim 14, wherein the provisioning request comprises identifying information verifying that the secure element is associated with an account corresponding to the VME.

17. The non-transitory computer-readable storage medium of claim 14, wherein the VME is encrypted using a key unique to the secure element.

18. The non-transitory computer-readable storage medium of claim 14, wherein the operations further include, prior to receiving the VME:
obtaining, by the application processor of the client device from the secure element, a device identifier corresponding to the client device; and
transmitting, by the application processor of the client device to the remote server, the device identifier with the provisioning request.

19. The non-transitory computer-readable storage medium of claim 14, wherein challenge value comprises a one-time-use value preloaded on the secure element.

* * * * *